United States Patent
Kim

(10) Patent No.: US 11,031,008 B2
(45) Date of Patent: Jun. 8, 2021

(54) TERMINAL DEVICE AND METHOD FOR CONTROLLING THEREOF

(71) Applicant: Samsung Electronics Co., Ltd., Suwon-si (KR)

(72) Inventor: Minseok Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 119 days.

(21) Appl. No.: 16/380,034

(22) Filed: Apr. 10, 2019

(65) Prior Publication Data

US 2020/0193982 A1 Jun. 18, 2020

(30) Foreign Application Priority Data

Dec. 17, 2018 (KR) .................... 10-2018-0163354

(51) Int. Cl.
| | |
|---|---|
| *G10L 15/22* | (2006.01) |
| *G10L 15/30* | (2013.01) |
| *G10L 25/84* | (2013.01) |

(52) U.S. Cl.
CPC ............ *G10L 15/22* (2013.01); *G10L 15/30* (2013.01); *G10L 25/84* (2013.01); *G10L 2015/223* (2013.01)

(58) Field of Classification Search
CPC ......... G10L 15/22; G10L 15/00; G10L 15/01; G10L 15/08; G10L 15/183; G10L 15/20;
(Continued)

(56) References Cited

U.S. PATENT DOCUMENTS

| 8,340,975 B1 | 12/2012 | Rosenberger |
|---|---|---|
| 9,779,734 B2 | 10/2017 | Lee |

(Continued)

FOREIGN PATENT DOCUMENTS

| KR | 10-2015-0103586 A | 9/2015 |
|---|---|---|
| KR | 10-2015-0113701 A | 10/2015 |

OTHER PUBLICATIONS

Adrian Willings; How to use multiple Amazon Echo and Echo Dots together; https://www.pocket-lint.com/smart-home/news/amazon/139677-how-to-use-multiple-amazon-echo-and-dots-setting-up-and-using-multiple-alexa-devices; Jul. 30, 2018.

(Continued)

*Primary Examiner* — Qi Han
(74) *Attorney, Agent, or Firm* — Jefferson IP Law, LLP

(57) ABSTRACT

A terminal device is provided. The terminal device includes a communication interface, and a processor configured to receive performance information of one or more other terminal devices from each of the one or more other terminal devices, identify an edge device to perform voice recognition based on the performance information received from each of the one or more other terminal devices, based on the terminal device being identified as the edge device, receive information associated with reception quality from one or more other terminal devices which receive a sound wave including a triggering word, determine a terminal device to acquire the sound wave for voice recognition from based on the received information associated with the reception quality, and transmit, to the determined terminal device, a command to transmit the sound wave acquired for voice recognition to an external voice recognition device.

20 Claims, 15 Drawing Sheets

(58) Field of Classification Search
CPC ....... G10L 15/24; G10L 15/263; G10L 15/32;
G10L 2015/22; G10L 2015/00; G10L
2015/08; G10L 2015/183; G10L
2015/221; G10L 2015/223; G10L
2015/226; G10L 2015/228
USPC .............. 704/233, 231, 235, 236, 246, 250,
704/251.27, 270.1, 275
See application file for complete search history.

(56) References Cited

U.S. PATENT DOCUMENTS

| | | | |
|---|---|---|---|
| 10,026,401 B1* | 7/2018 | Mutagi | .................... G06F 3/167 |
| 2013/0073293 A1 | 3/2013 | Jang et al. | |
| 2015/0019219 A1 | 1/2015 | Tzirkel-Hancock et al. | |
| 2016/0226823 A1 | 8/2016 | Ansari et al. | |
| 2017/0076720 A1 | 3/2017 | Gopalan et al. | |
| 2017/0084277 A1 | 3/2017 | Sharifi | |
| 2017/0092270 A1 | 3/2017 | Newendorp et al. | |
| 2017/0330564 A1 | 11/2017 | Daley et al. | |
| 2018/0374022 A1* | 12/2018 | Wang | ....................... G06T 7/254 |
| 2019/0295542 A1* | 9/2019 | Huang | .................... G10L 15/30 |

OTHER PUBLICATIONS

International Search Report and Written Opinion dated Sep. 17, 2019, issued in International Patent Application No. PCT/KR2019/004542.

* cited by examiner

TERMINAL DEVICE AND METHOD FOR CONTROLLING THEREOF

CROSS-REFERENCE TO RELATED APPLICATION(S)

This application is based on and claims priority under 35 U.S.C. § 119(a) of a Korean patent application number 10-2018-0163354, filed on Dec. 17, 2018, in the Korean Intellectual Property Office, the disclosure of which is incorporated by reference herein in its entirety.

BACKGROUND

1. Field

The disclosure relates to a terminal device and a controlling method thereof. More particularly, the disclosure relates to a terminal device for determining a device, from among a plurality of terminal devices, to acquire a sound wave generated by a user to recognize voice, and a controlling method thereof.

2. Description of Related Art

In recent years, artificial intelligence (AI) systems that implement human intelligence have been used in various fields. An AI system is a system that the machine learns, judges, and becomes smart, unlike the existing rule-based smart system. As the use of AI systems improves, a recognition rate and understanding or anticipation of a user's taste may be performed more accurately. As such, existing rule-based smart systems are gradually being replaced by deep learning-based AI systems.

AI technology is composed of machine learning (for example, deep learning) and elementary technologies which utilizes machine learning.

Machine learning is an algorithm technology that is capable of classifying or learning characteristics of input data without additional information or intervention. Element technology is a technology that simulates functions such as recognition and judgment of human brain using machine learning algorithms such as deep learning. Machine learning relies on numerous technical fields such as linguistic understanding, visual understanding, reasoning, prediction, knowledge representation, motion control, etc.

Various fields in which AI technology is applied include, for example, linguistic understanding, visual understanding, inference prediction, knowledge representation, and motion control. Linguistic understanding is a technology for recognizing, applying, and/or processing human language or characters and includes natural language processing, machine translation, dialogue system, question and answer, voice recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, and recommendation. Knowledge representation is a technology for automating human experience information into knowledge data, including knowledge building (data generation or classification) and knowledge management (data utilization). Motion control is a technique for controlling the autonomous running of the vehicle and the motion of the robot, including motion control (navigation, collision, driving), operation control (behavior control), and the like.

Meanwhile, in recent years, various services using an AI agent (for example, Bixby™, Assistant™, Alexa™, etc.) for providing a response to a user's voice input have been provided. However, when there is a plurality of devices in which include an artificial intelligent agent provided within a small geographical area, there is confusion such that a plurality of devices receiving a user's voice provide responses.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which determines a device, from among a plurality of terminal devices, to acquire a sound wave generated by a user to recognize voice, and a controlling method thereof, in consideration of at least one of performance information and voice reception quality information.

Another aspect of the disclosure is to provide a communication interface comprising communication circuitry, and a processor configured to receive performance information of one or more other terminal devices from each of the one or more other terminal devices through the communication interface, identify an edge device to perform voice recognition from among the terminal device and the one or more other terminal devices based on the performance information received from each of the one or more other terminal devices, based on the terminal device being identified as the edge device, receive information associated with reception quality from one or more other terminal devices which receive a sound wave including a triggering word from among the one or more other terminal devices which transmit the performance information, determine a terminal device to acquire the sound wave for voice recognition from based on the received information associated with the reception quality, from among the one or more other terminal devices which receive the sound wave, and transmit, to the determined terminal device, a command to transmit the sound wave acquired for voice recognition to an external voice recognition device.

Additional aspects will be set forth in part in the description which follows and, in part, will be apparent from the description, or may be learned by practice of the presented embodiments.

The performance information received from each of the one or more other terminal devices comprises a first score that is acquired based on performance of the one or more other terminal devices, and the information associated with reception quality that is received from the one or more other terminal devices which receive the sound wave may include a second score that represents reception quality associated with the sound wave received by the one or more terminal devices.

The processor may determine a terminal device having a highest second score value, from among the one or more other terminal devices which receive the sound wave, as a terminal device to acquire the sound wave for voice recognition.

In accordance with an aspect of the disclosure, a terminal device is provided. The terminal device may further include a microphone, and the processor acquires a second score of the terminal device based on at least a part of the sound wave based on the sound wave including the triggering word being received at the microphone, determine a terminal device having a highest second score, from among the terminal device and the one or more other terminal devices which receive the sound wave, as a terminal device to acquire the sound wave for voice recognition, and based on the terminal device being determined as a terminal device to acquire the sound wave, acquire a portion of the sound wave that is received after the triggering word and transmit the acquired portion of the sound wave to an external voice recognition device.

The information on the reception quality may be acquired based on at least one of a signal to noise ratio (SNR), a volume of the received sound wave, a change rate of the volume of the received sound wave, sound pressure, and distance from a source of the sound wave.

The performance information may be acquired based on at least one of a number of connected other terminal devices, a number of types of available communication networks, a connection method with a server, a power supply method, processing performance, memory performance, and a location movement status.

The processor may, based on a second score of the determined terminal device being less than a preset value, change a terminal device having a highest second score value, from among the one or more other terminal devices which receive the sound wave, as a terminal device to acquire the sound wave for voice recognition.

At least one of a first score and a second score received from each of the one or more other terminal devices may include information on at least one of the first score and the second score of a terminal device which is in communication with the one or more other terminal devices and which is not in communication with the terminal device.

In accordance with another aspect of the disclosure, a terminal device is provided. The terminal device may further include a memory including a voice recognition module, the processor may, based on the sound wave being received from the determined terminal device, perform voice recognition on the sound wave using the voice recognition module, and transmit the voice recognition result to an external server, and the external server may determine a terminal device to perform an operation to correspond to the voice recognition result from among the terminal device and the one or more other terminal devices based on the voice recognition result, and transmit an operation execution command corresponding to the voice recognition result to a terminal device to perform the operation.

In accordance with another aspect of the disclosure, a terminal device is provided. The terminal device may further include a microphone, and the processor may, based on the first score of the terminal device being less than the first score of the one or more other terminal devices, determine other terminal device having a highest first score, from among the one or more other terminal devices, as an edge device, based on the sound wave including the triggering word being received at the microphone, acquire information associated with reception quality based on at least a part of the sound wave, and transmit the acquired information on the reception quality to the determined edge device.

The processor may, based on the second score of the terminal device being less than a preset value, not transmit the second score to the determined edge device.

In accordance with an aspect of the disclosure, a method of controlling a terminal device is provided. The method includes receiving information on performance information of the one or more other terminal devices from each of the one or more other terminal devices, identifying an edge device to determine a terminal perform voice recognition from among the terminal device and the one or more other terminal devices based on the performance information received from each of the one or more other terminal devices, based on the terminal device being identified as the edge device, receiving information associated with reception quality from one or more other terminal devices which receive a sound wave including a triggering word from among the one or more other terminal devices which transmit the performance information, determining a terminal device to acquire the sound wave for voice recognition from based on the received information associated with the reception quality, from among the one or more other terminal devices which receive the sound wave, and transmitting, to the determined terminal device, a command to transmit the sound wave acquired for voice recognition to an external voice recognition device.

The performance information received from each of the one or more other terminal devices may include a first score that is acquired based on performance of the other terminal devices, and the information associated with reception quality that is received from the one or more other terminal devices which receive the wound wave may include a second score that represents reception quality associated with the sound wave received by the one or more other terminal devices.

The determining may include determining a terminal device having a highest second score value, from among the one or more other terminal devices which receive the sound wave, as a terminal device to acquire the sound wave for voice recognition.

The determining may include, based on the sound wave including the triggering word being received the microphone, acquiring a second score of the terminal device based on at least a part of the sound wave, determining a terminal device having a highest second score, from among the terminal device and the one or more other terminal devices which receive the sound wave, as a terminal device to acquire the sound wave for voice recognition, based on the terminal device being determined as a terminal device to acquire the sound wave, acquiring a portion of the sound wave that is received after the triggering word, and transmitting the acquired portion of the sound wave to an external voice recognition device.

The information on the voice reception quality may be acquired based on at least one of a SNR, a volume of the received sound wave, a change rate of the volume of the received sound wave, sound pressure, and distance from the source of the sound wave.

The performance information may be acquired based on at least one of a number of connected other terminal devices, a number of types of available communication networks, a connection method with a server, a power supply method, processing performance, memory performance, and location movement status.

In accordance with an aspect of the disclosure, a controlling method is provided. The method includes, based on a second score of the determined terminal device being less than a preset value, changing a terminal device having a highest second score value, from among the one or more other terminal devices which receive the sound wave, as a terminal device to acquire the sound wave for voice recognition.

At least one of a first score and a second score received from each of the one or more other terminal devices may include information on at least one of the first score and the second score of a terminal device which is in communication with the one or more other terminal devices and which is not in communication with the terminal device.

In accordance with an aspect of the disclosure, a controlling method is provided. the method includes, based on the sound wave being received from the determined terminal device, performing voice recognition on the received sound wave using the voice recognition module stored in a memory, and transmitting the voice recognition result to an external server, and the external server may determine a terminal device to perform an operation to correspond to the voice recognition result from among the terminal device and the one or more other terminal devices based on the voice recognition result, and transmit an operation execution command corresponding to the voice recognition result to a terminal device to perform the operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
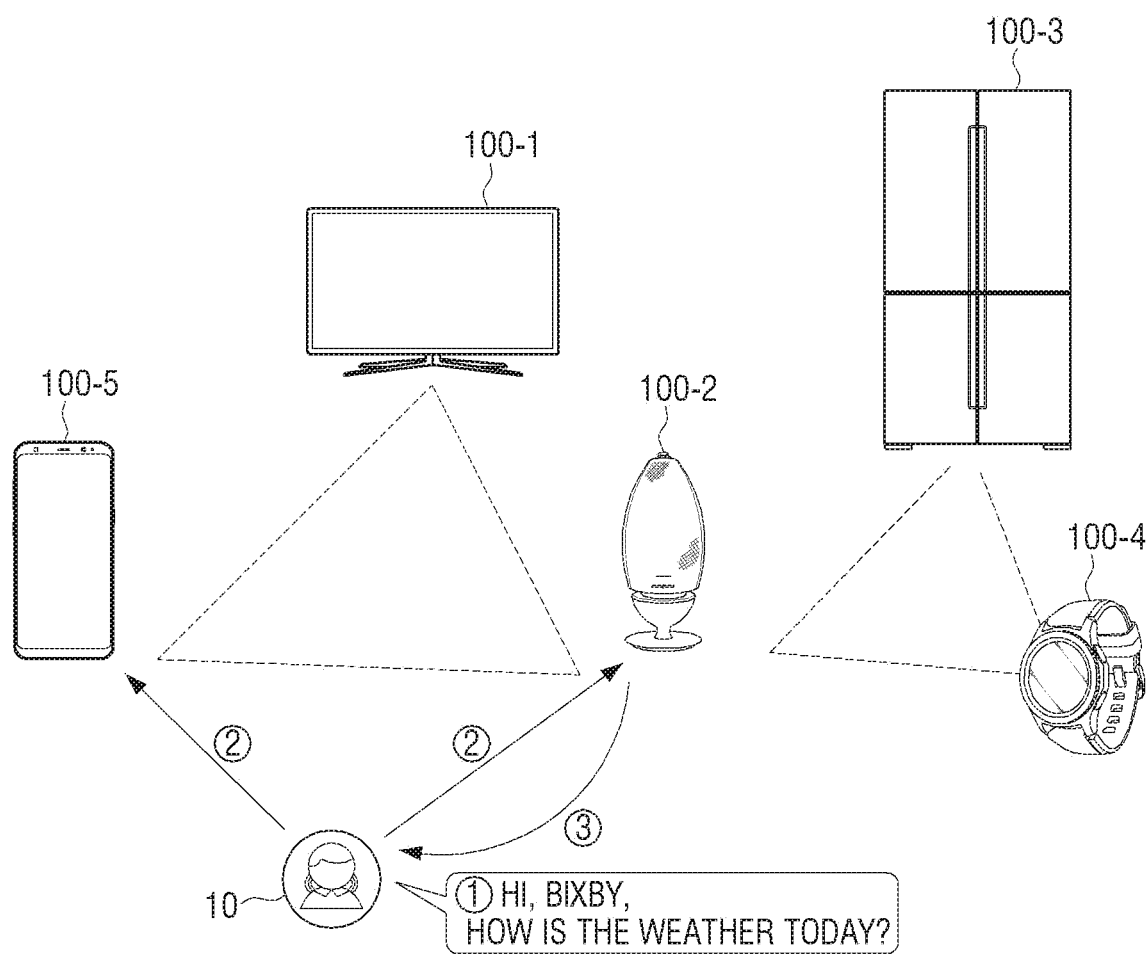
FIG. 1 illustrates a voice recognition system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As embodiments may have a variety of modifications and several examples, certain embodiments will be exemplified in the drawings and described in detail in the description thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the disclosure, relational terms such as first and second, and the like, may be used to distinguish one entity from another entity, without necessarily implying any actual relationship or order between such entities. In embodiments of the disclosure, relational terms such as first and second, and the like, may be used to distinguish one entity from another entity, without necessarily implying any actual relationship or order between such entities.

The terms "include," "comprise," "is configured to," etc., of the description are used to indicate that there are features, numbers, operations, elements, parts or combination thereof, and they should not exclude the possibilities of combination or addition of one or more features, numbers, operations, elements, parts or a combination thereof.

According to embodiments, a "module" or "unit" performs at least one function or operation, and may be implemented as hardware or software, or a combination of hardware and software. In addition, a plurality of 'modules' or a plurality of 'units' may be integrated into at least one module and may be realized as at least one processor except for 'modules' or 'units' that should be realized in a specific hardware.

Hereinafter, embodiments of the disclosure will be described in detail with reference to the accompanying drawings so that those skilled in the art can easily carry out the disclosure. However, the disclosure may be embodied in many different forms and is not limited to the embodiments described herein. In order to clearly illustrate the disclosure in the drawings, portions which are not related to the description have been omitted, and like reference numerals have been assigned to similar portions throughout the specification.

Hereinbelow, embodiments of the disclosure will be further described with reference to drawings.

FIG. 1 illustrates a voice recognition system according to an embodiment of the disclosure.

Referring to FIG. 1, a voice recognition system 1000 according to an embodiment of the disclosure may include a plurality of terminal devices 100-1 to 100-5. For example, a first terminal device 100-1 (e.g., a smart TV), a second terminal device 100-2 (e.g., a smart speaker), and a fifth terminal device 100-5 (e.g., a mobile device) may perform direct communication with each other. That is, the first terminal device 100-1 may be configured to transmit messages to and/or receive messages from the second terminal device 100-2 and the fifth terminal device 100-5, the second terminal device 100-2 may be configured to transmit messages to and/or receive messages from the first terminal device 100-1 and the fifth terminal device 100-5, and the fifth terminal device 100-5 may be configured to transmit messages to and/or receive messages from the first terminal device 100-1 and the second terminal device 100-2. Likewise, the second terminal device 100-2, a third terminal device 100-3 (e.g., a home appliance), and a fourth terminal device 100-4 (e.g., a smart watch) may perform direct communication with each other.

While direct communication is described with respect to FIG. 1, one or more of the plurality of terminal devices 100-1 to 100-5 or other terminals not illustrated in FIG. 1 but included in the voice recognition system 1000 may not establish direct communication while communicating with one or more other terminal devices within the voice recognition system 1000. For example, one or more of the plurality of terminal devices 100-1 to 100-5 may perform indirect communication with another terminal device of the voice recognition system 1000 such that any communication may be transmitted between two terminal devices via a third terminal device. For example, if the fifth terminal device 100-5 intended to communicate with the third terminal device 100-3, the fifth terminal device 100-5 may transmit a message to the second terminal device 100-2 and the second terminal device 100-2 may transmit the message received from the fifth terminal device 100-5 to the third terminal device 100-3.

The terminal devices 100-1 to 100-5 may have a separate and/or different configuration from a server, and may refer to devices directly used by a user 10. For example, the terminal device may be various electronic devices such as a television (TV), a mobile phone, a smartphone, a personal digital assistant (PDA), a notebook personal computer (PC), a desktop, a tablet PC, an electronic book, and an electronic frame, a kiosk, a refrigerator, a washing machine, a smart speaker, a smart watch, an air conditioner, an audio, a digital video disc (DVD) player, a microwave, an air cleaner, a door lock, a boiler, a closed-circuit television (CCTV), a fire alarm device, a home appliance, a home system or environment regulation device (e.g., heating, ventilation, humidifier, sump pump, water filtration, etc.), or the like.

As illustrated in FIG. 1, the user 10 may utter a voice (e.g., generate a sound wave) that is intended to trigger a response from one or more of the terminal devices 100-1 to 100-5 such that the one or more terminal devices 100-1 to 100-5 perform a function in response based on the generated sound wave (⓪), and at least one of the terminal devices 100-2 and 100-5, from among a plurality of terminal devices 100-1 to 100-5, may receive the sound wave (®). For example, a sound wave generated by user's voice that is received by the at least one terminal devices 100-2 and 100-5 may include a triggering word or phrase for activating a function.

If at least one terminal device 100-2 and 100-5 from among the plurality of terminal devices 100-1 to 100-5 of the voice recognition system 1000 receives the generated sound wave, the terminal device that receives the generated sound wave may forward the sound wave to the appropriate or intended terminal device suitable to perform an operation or function corresponding to the sound wave ( ). For example, as illustrated in FIG. 1, the second terminal device 100-2 may be both the terminal device that directly receives the sound wave as well as the terminal device that is intended to perform the operation corresponding to the sound wave based on a triggering word or phrase corresponding to the sound wave. Alternatively, the second terminal device 100-2 and the fifth terminal device 100-5 may receive the sound wave and one or more of the other terminal devices (e.g., terminal devices 100-1, 100-3, and 100-4) may be the terminal device that is intended to perform the operation corresponding to the sound wave. As such, the terminal device that receives the sound wave may forward the sound wave or information associated with the sound wave to the intended terminal device such that the intended terminal device may perform the corresponding operation or function based on the sound wave.

The plurality of terminal devices 100-1 to 100-5 may be disposed in close proximity (e.g., within a predetermined space). Here, the predetermined space may be a space within a home such as a "living room", "a main room", "a kitchen", etc. If different users in different spaces generate a sound wave including a triggering word or phrase at the same time, one terminal device in each space may receive a sound wave generated by the different users.

Exemplary processes to determine which terminal device of the plurality of terminal devices 100-1 to 100-5 of the voice recognition system 100 may perform an operation or function based on a sound wave received from one or more users will be described in detail with reference to the accompanying drawings.

Figure 2:
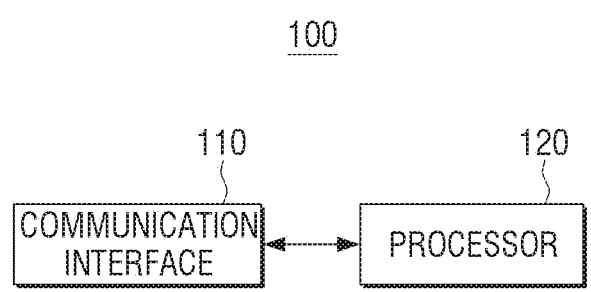
FIG. 2 is a block diagram illustrating a configuration of a terminal device according to an embodiment of the disclosure.

FIG. 2 is a block diagram illustrating a configuration of a terminal device according to an embodiment of the disclosure.

Referring to FIG. 2, the terminal device 100 may include a communication interface 110 and a processor 120.

The communication interface 110 may be configured to communicate with various types of external devices according to various types of communication methods. The external device communicating with the terminal device 100 may be a server and/or one or more other terminal devices.

Communication with the communication interface 110 with an external device may include communication via a third device (e.g., a repeater, a hub, an access point, a server, or a gateway). The communication interface 110 may be configured to communicate using wireless communication including cellular communication using at least one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM) and the like. According to one embodiment, the wireless communication may additionally or alternatively include at least one of, for example, wireless fidelity (Wi-Fi), Bluetooth, Bluetooth low energy (BLE), Zigbee, near field communication (NFC), magnetic secure transmission, radio frequency (RF), or body area network (BAN). The communication interface 110 may be configured to communicate using wired communications. Wired communications may include at least one of, for example, a universal serial bus (USB), a high definition multimedia interface (HDMI), a recommended standard 232 (RS-232), a power line communication, or a plain old telephone service (POTS). The network over which the wireless or wired communication is performed may include at least one of a telecommunications network, e.g., a computer network (e.g., local area network (LAN) or wide area network (WAN)), the Internet, or a telephone network.

The processor 120 may be configured to control an operation of the terminal device 100.

According to one embodiment, the processor 120 may be implemented as a digital signal processor (DSP), a microprocessor, or a time controller (TCON). However, the disclosure is not limited thereto, and may include or be defined as a central processing unit (CPU), a microcontroller unit (MCU), a micro processing unit (MPU), a controller, an application processor (AP), a communication processor (CP), and an Advanced reduced instruction set computer (RISC) Machines (ARM) processor. The processor 120 may be implemented as a system on chip (SoC), a large scale integration (LSI) with a built-in processing algorithm, or a field programmable gate array (FPGA).

In an exemplary embodiment, the processor 120 may share performance information with one or more other terminal devices connected through the communication interface 110. For example, the processor 120 may transmit the performance information of the terminal device 100 to the one or more other terminal devices through the communication interface 110, or may receive the performance information of each of the one or more other terminal devices from the one or more other terminal devices.

In this case, the performance information transmitted to or received from the one or more other terminal devices may be used for identifying an edge device for determining a terminal device from among a plurality of terminal devices to acquire a voice or sound wave for voice recognition. An edge device may be referred to as a main terminal device, an edge computing device, or the like. The plurality of terminal devices may include the terminal device 100 and one or more other terminal devices.

The performance information may include a score (hereinafter referred to as a first score or a performance score (P-score)) obtained based on the performance of each terminal device.

For example, a score based on performance is a score obtained by scoring a plurality of criteria, and examples of a plurality of criteria may be as Table 1.

TABLE 1

| | | |
|---|---|---|
| $C_1$ | Number of Neighboring Devices | Networking Criteria |
| $C_2$ | Network IF (Wi-Fi, BT/BLE, etc.) | |
| $C_3$ | Server Connection (Wired/Wireless) | |
| ... | ... | |
| $C_{k-2}$ | Power Supply (Battery/DC) | Performance Criteria |
| $C_{k-1}$ | Computing Power (Processor) | |
| $C_k$ | Computing Power (Memory) | |
| ... | ... | |
| $C_{n-1}$ | Mobile/Stationary | Stability Criteria |
| $C_n$ | Stable Time | |
| ... | ... | |
| $C_{p-1}$ | (Touch) Screen | User Interface Criteria |
| $C_p$ | Sound/Audio | |

Referring to Table 1, the processor 120 may obtain a score based on performance on a basis of various criteria such as networking criteria, performance criteria, stability criteria, user interface criteria, or the like.

Specifically, the performance information is for determining an edge device and may include whether a device is advantageous for data processing. For example, the networking criteria may include the number of neighboring devices, an operable networking IF, and a server connection via wire or wireless communication, or the like. For example, the terminal device 100 may receive a high score when the number of other connected terminal devices is large, the number of operable networking methods is large, and communication between the server and the terminal device 100 is a wired connection.

Alternatively, or additionally, performance criteria may include power supply (e.g., battery vs. DC), processing or computing power (processor, memory), and the like. In an exemplary embodiment, the terminal device 100 may obtain a higher score when power is supplied to the terminal device 100 directly (e.g., via DC connections) rather than from the battery. In another exemplary embodiment, the terminal 100 may obtain a higher score based on the amount of power consumed during processing or interactions with the memory.

Alternatively, or additionally, the performance criteria may include a stability criteria such as a mobility factor (e.g., how much a device is changing location), a stationary factor, a stable time, and the like may be considered. When the change in position or movement is not frequent and the stabilization time is longer, the terminal device 100 may be assigned a higher score.

Alternatively, or additionally, the user interface criterion may include a relatively auxiliary criterion, and when a touch screen is provided or sound output is available, a high score may be obtained.

The processor 120 may evaluate the performance of the terminal device 100 according to one or more of the plurality of criteria and calculate the performance as a score. The processor 120 may obtain a score based on the performance information of the terminal device 100 by summing the scores reflecting the weights according to the importance of each of the plurality of criteria as shown in the following Equation 1.

$$P_i = \Sigma_k w_k C_k \qquad \text{Equation 1}$$

Here, $P_i$ is a first score of the terminal device i, $w_k$ is a weight of the criteria, and $C_k$ may be a score of the criteria.

For example, since the performance criteria described above are relatively important, the weights are high, and the user interface criteria are relatively low in importance, so the weights may be low. Also, if the item is not applied, the weight may be zero.

The processor 120 may transmit performance information of the terminal device 100 obtained on the basis of various criteria to the one or more other terminal devices as described above. Specifically, the processor 120 may transmit a first score based on the performance information to the one or more other terminal devices.

Meanwhile, the processor 120 may receive performance information of the one or more other terminal devices from the one or more other terminal devices. In an exemplary embodiment, the terminal device 100 may receive a first score of the one or more other terminal devices calculated by the one or more other terminal devices, or receive information on the performance of the one or more other terminal devices, and calculate the first score of the one or more other terminal devices by the processor 120.

The performance information received from the one or more other terminal devices may include performance information associated with the terminal devices connected to the one or more other terminal devices. Accordingly, the processor 120 may acquire performance information of not only a 1-hop neighbor device directly connected to the terminal device 100 but also a 2-hop or more neighbor device connected only to the one or more other terminal device (1-hop neighbor device), and identify an edge device including 2-hop or more neighbor device. The operation of sharing the performance information with the one or more other terminal devices will be described in detail with reference to FIGS. 4 to 6.

The processor 120 may identify the edge device using the performance information of the obtained terminal device 100 and the performance information of the received one or more other terminal devices. Specifically, the processor 120 may identify the terminal device with the highest first score based on performance information as the edge device.

In an exemplary embodiment, the edge device may be a local terminal device rather than a server. As the amount of data has drastically increased due to the popularization of the Internet (Internet of things (IoT)) device, cloud computing has faced limitations. The edge device as determined in exemplary embodiments herein may be a device that can implement edge computing technology to overcome the limitations introduced by using a server. In an exemplary embodiment, the edge device may be a device that can perform all or part of the computing tasks performed in a server according to the related art.

The edge device identified in this embodiment may determine a device to perform voice recognition from among a plurality of terminal devices. Performing voice recognition may include at least one of an operation of activating a microphone to receive a sound wave, an operation of transmitting information associated with a received sound wave to a server for performing voice recognition, as well as an operation of performing voice recognition by the device that receives the sound wave via a microphone.

Based on the performance information, when the terminal device 100 is identified as an edge device, the processor 120 may receive information on the voice reception quality from one or more other terminal devices. For example, the one or more other terminal devices transmitting the information on the sound wave reception quality may be at least one terminal device which has received the sound wave including the triggering word or phrase among the one or more other terminal devices. In an exemplary embodiment, the triggering word or phrase may be a call word or phrase for activating an artificial intelligence (AI) assistant function of the terminal device 100 and may be referred to as a wake-up word, such as "Bixby", "Siri", "Okay Google" and "Alexa" or the like.

In an exemplary embodiment, the information associated with the sound wave reception quality may be for determining a device to which the sound wave generated by a user is received (e.g., as an input at a receiving device) with the best quality. For example, the information associated with the sound wave reception quality may include a score (hereinafter a second score, or quality score (Q-score)) obtained based on at least one of information on the performance of the microphone in the terminal device 100, the signal to noise ratio (SNR), the volume associated with the received sound wave, the change rate of the volume of the received sound wave, sound pressure, and information associated with a distance between the user that generated the sound wave and the terminal device 100.

In an exemplary embodiment, the information associated with the distance between the user that generated the sound wave and the terminal device 100 may be obtained by at least one sensor (e.g., sensor 160) provided in the terminal device 100.

According to the embodiment, the terminal device 100 may receive the score calculated by the one or more other terminal devices, receive the sound wave signal received by the one or more other terminal devices, and obtain the second score of the one or more other terminal devices by the processor 120.

In an exemplary embodiment, the performance information received from the one or more other terminal devices may include information on the sound wave reception quality of the terminal devices connected to the one or more other terminal devices. Accordingly, the processor 120 may acquire information on the sound wave reception quality of the terminal device (e.g., a 2-hop or more neighbor device) connected only to the one or more other terminal devices without being connected to the terminal device 100.

The processor 120 may determine a device to perform voice recognition based on information on the sound wave reception quality of each of the at least one terminal device that has received the sound wave including the triggering word or phrase. Specifically, the processor 120 may determine a device to perform voice recognition using the second score of the at least one terminal device that has received the sound wave including the triggering word or phrase.

Specifically, the processor 120 may determine the terminal device having the highest second score value among the at least one terminal device that has received the sound wave as a device to perform voice recognition.

Meanwhile, the processor 120 may determine a device to perform voice recognition including not only information of the sound wave reception quality but also performance information of at least one terminal device which received the sound wave. Then, the processor 120 may transmit a voice recognition command to the determined terminal device.

Specifically, the processor 120 may obtain B-score to determine a device which is most suitable to perform voice recognition according to summation of the first score and the second score which reflect the weights according to a degree of importance as shown in the Equation 2 below.

$$B_i = w_1 P_i + w_2 Q_i \qquad \text{Equation 2}$$

Here, $P_i$ is the first score of the terminal device i, $w_1$ is the weight of the first score, $Q_i$ is the second score of the terminal device i, and $w_2$ is the weight of the second score.

For example, as for a score for determining a device that is most suitable to perform voice recognition, quality of received sound wave is important. When a terminal device which receives a sound wave directly performs voice recognition without transmitting the received sound wave to a server according to an embodiment, performance of a terminal device and the first score may be considered together. When the received sound wave is transmitted to a server, $w_1$ may be low or zero.

In another embodiment, when information associated with the sound wave reception quality is received from a plurality of terminal devices that have received the sound wave, if the difference between the second scores or the B-score between the plurality of terminal devices is within a predetermined value, the processor 120 may determine a terminal device that has transmitted information on the received sound wave reception quality as a voice recognition device. Through this, the real-time property can be secured in the voice recognition process.

In the meantime, when the terminal device 100 is an edge device, the processor 120 may determine the terminal device having the highest B-score as a terminal device to perform voice recognition. Then, the processor 120 may transmit a voice recognition command to the determined terminal device.

In an exemplary embodiment, when the terminal device 100, which is an edge device, is a device capable of analyzing the sound wave to discern an intention of the user, the processor 120 may receive the sound wave signal which is input from the device that receives the voice. For example, the voice recognition may include an analysis on the intention of the user. The processor 120 may generate an operation execution command through voice recognition, and may determine a terminal device to perform an operation corresponding to the input sound wave. The processor 120 may transmit a generated operation execution command to the terminal device to perform the operation corresponding to the sound wave.

In one embodiment, the processor 120 may determine a device that performs an intention analysis of the sound wave generated by the user, depending on the length of the sound wave. For example, if the length of the sound wave is short, the number of words may be small, or the word corresponding to a specific terminal device may be included, the processor 120 can directly perform the intention analysis of the sound wave generated by the user. The word corresponding to a specific terminal device may be a term mainly used in a terminal device included in the voice recognition system 1000. For example, "please turn up/down the temperature", "temperature" is a term mainly used in environmental regulations such as heating, air conditioning, etc. If "temperature" is determined to be included in the sound wave, the processor 120 may directly analyze the intention of the user that generated the sound wave, generate a corresponding control command, and transmit the generated control command to the terminal device that is an air-conditioner.

If the length of the sound wave is long or the number of words associated with the sound wave is large, the processor 120 may transmit the received voice signal to the external server for the purpose of analyzing the sound wave generated by the user. For example, the processor 120 may transmit the voice signal (e.g., sound wave) that is input or received at the input device to a server, or receive only length information of the voice signal that is input from the input device and transmit the information on whether to transmit to a server or the terminal device 100 to the device which receives the voice.

As described above, even if a plurality of terminal devices simultaneously receives a sound wave generated by a user, by identifying an edge device among a plurality of terminal devices and determining a device for performing voice recognition by the identified edge device, it may be possible to perform an operation corresponding to the sound wave generated by a user only in one terminal device.

Figure 3:
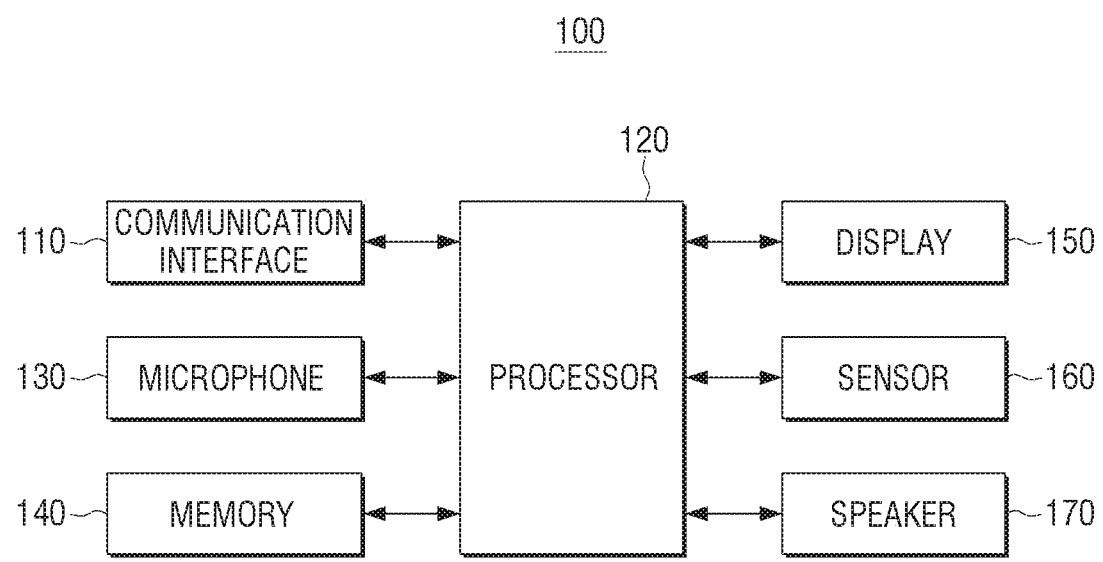
FIG. 3 is a block diagram illustrating a detailed configuration of the terminal device of FIG. 2 according to an embodiment of the disclosure.

FIG. 3 is a block diagram illustrating a detailed configuration of the terminal device of FIG. 2 according to an embodiment of the disclosure.

Referring to FIG. 3, the terminal device 100 may include a communication interface 110, a processor 120, a microphone 130, a memory 140, a display 150, a sensor 160, and a speaker 170.

Some operations of the communication interface 110 and the processor 120 are the same as those of FIG. 2, overlapped description will be omitted.

The microphone 130 may receive a sound wave generated by a user. The microphone 130 generates (or converts) a voice or a sound wave received from the outside under the control of the processor 120 into an electrical signal. The electrical signal generated by the microphone 130 may be converted by the processor 120 and stored in the memory 140 or may be transmitted to an external device for performing voice recognition through the communication interface 110.

In an exemplary embodiment, when a sound wave including a triggering word or phrase is received via the microphone 130, the terminal device to perform voice recognition may be determined as the terminal device 100. The edge device for determining the device to perform voice recognition may or may not be the terminal device 100.

For example, if the terminal device 100 is an edge device, and when the terminal device 100 is determined as a device to recognize the sound wave based on at least one of the first score and the second score, the processor 120 may perform voice recognition with respect to the sound wave received after identifying that the sound wave includes the triggering word or phrase.

In an exemplary embodiment, the processor 120 may transmit the electrical signal associated with the received sound wave, after the triggering word or phrase is identified, to an external server for performing voice recognition. For example, the external server may perform voice recognition, determine a terminal device to generate an operation execution command and perform operation based on the voice recognition result, and transmit an operation performing command to the determined terminal device.

If the terminal device 100, which is an edge device, is a device capable of performing voice recognition, the processor 120 can perform voice recognition on the received sound after the triggering word or phrase is identified. the received sound wave may be received by the terminal device 100 through the microphone 130, or may be an electrical signal associated with a sound wave which is provided by the one or more other terminal devices.

The processor 120 may transmit the voice recognition result to the external server. Based on the voice recognition result, the external server may transmit, to a terminal device to perform an operation corresponding to a voice recognition result from among a plurality of terminal devices, an operation execution command corresponding to the voice recognition result. According to an embodiment of the disclosure, the processor 120 may not transmit the voice recognition result to the external server, but directly transmit the operation execution command corresponding to the voice recognition result to the terminal device that performs the operation corresponding to the voice recognition result, from among the plurality of terminal devices.

In the meantime, if the first score of the one or more other terminal devices is higher than the first score of the terminal device 100, the processor 120 may determine the terminal device having the highest first score among the one or more other terminal devices as the edge device. In an exemplary embodiment, upon receiving a sound wave including the triggering word or phrase via the microphone 130, the processor 120 may acquire information on the reception quality of the sound wave based on at least a part of the received sound wave. For example, the processor 120 may acquire information on the reception quality based on a sound wave including a triggering word or phrase, a sound wave received for a predetermined time after the triggering word or phrase including the triggering word or phrase, and a sound wave received for a predetermined time after the triggering word or phrase excluding the triggering word or phrase. The information on the reception quality may include the second score. Then, the processor 120 may control the communication interface 110 to transmit information on the acquired reception quality to the edge device.

At this time, if the acquired reception quality is less than a preset criteria, the processor 120 may discard information on the acquired reception quality without transmitting the information to the edge device. Specifically, if the acquired second score is less than a predetermined value, the processor 120 may discard the acquired second score without transmitting the second score to the edge device.

The memory 140 may store various programs and data necessary for the operation of the terminal device 100. For example, at least one instruction may be stored in the memory 140. The processor 120 may perform the operations described above by executing instructions stored in the memory 140. The memory 140 may be implemented as a non-volatile memory, a volatile memory, a flash memory, a hard disk drive (HDD), or a solid-state drive (SSD).

The learned AI model may be stored in the memory 140. In an exemplary embodiment, the learned AI model may be learned to recognize the received sound wave and convert the sound wave into text, or to determine the intention of the user based on the sound wave. As such, if the learned AI model for voice recognition is stored in the memory 140, the processor 120 may perform voice recognition using the stored AI model without transmitting the electrical signal associated with the received sound wave to an external server for performing voice recognition.

The display 150 may display various information under the control of the processor 120. In an exemplary embodiment, the display 150 may be implemented as a touch screen together with a touch panel. According to various embodiments, the display 150 may not be provided in the terminal device 100. For example, when the terminal device 100 is a smart speaker or the like, the display 150 may not be provided.

The sensor 160 may sense various status information of the terminal device 100 or the user. For example, the sensor 160 may include a motion sensor (e.g., a gyro sensor, an acceleration sensor, or the like) capable of sensing motion information of the terminal device 100, a sensor capable of sensing location information (e.g., a global positioning system sensor), a sensor capable of sensing environmental information (e.g., a temperature sensor, a humidity sensor, an air pressure sensor, an ultrasonic sensor, and an infrared sensor, etc.), and a sensor capable of sensing biological user information of the terminal device 100 (e.g., a blood pressure sensor, a blood glucose sensor, a pulse rate sensor, etc.), or the like. In addition, the sensor 160 may further include an image sensor (e.g., a camera) for photographing or capturing images of the environment outside of the terminal device 100.

The processor 120 may determine whether the user moves according to a distance and a change in distance between the user and the terminal device 100, based on various sensed values by the sensor 160. In an exemplary embodiment, the processor 120 can acquire information on the voice reception quality based on the distance between the user and the terminal device 100.

The speaker 170 may have a configuration to output various kinds of notification sounds or voice messages as well as various audio data for which various processing jobs such as decoding, amplification, noise filtering, etc. are performed by the audio processor. In particular, the speaker 170 may output a response to a sound wave generated by a user as a voice message in a natural language format. The configuration to output audio may be implemented as a speaker, but this can be implemented as an output terminal capable of outputting audio data.

Figure 4:
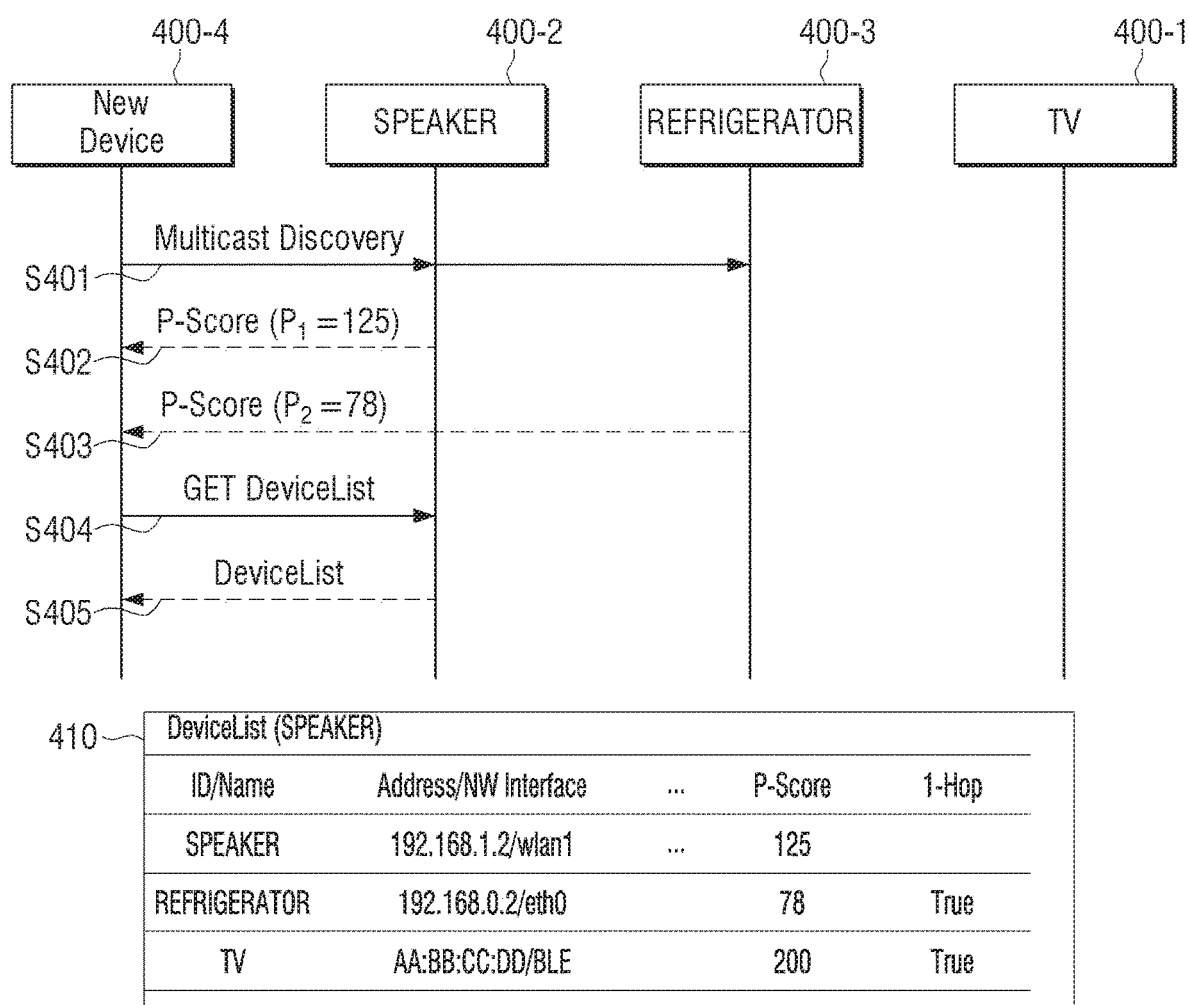
FIG. 4 illustrates a method for sharing performance information among a plurality of terminal devices according to an embodiment of the disclosure.
Figure 5:
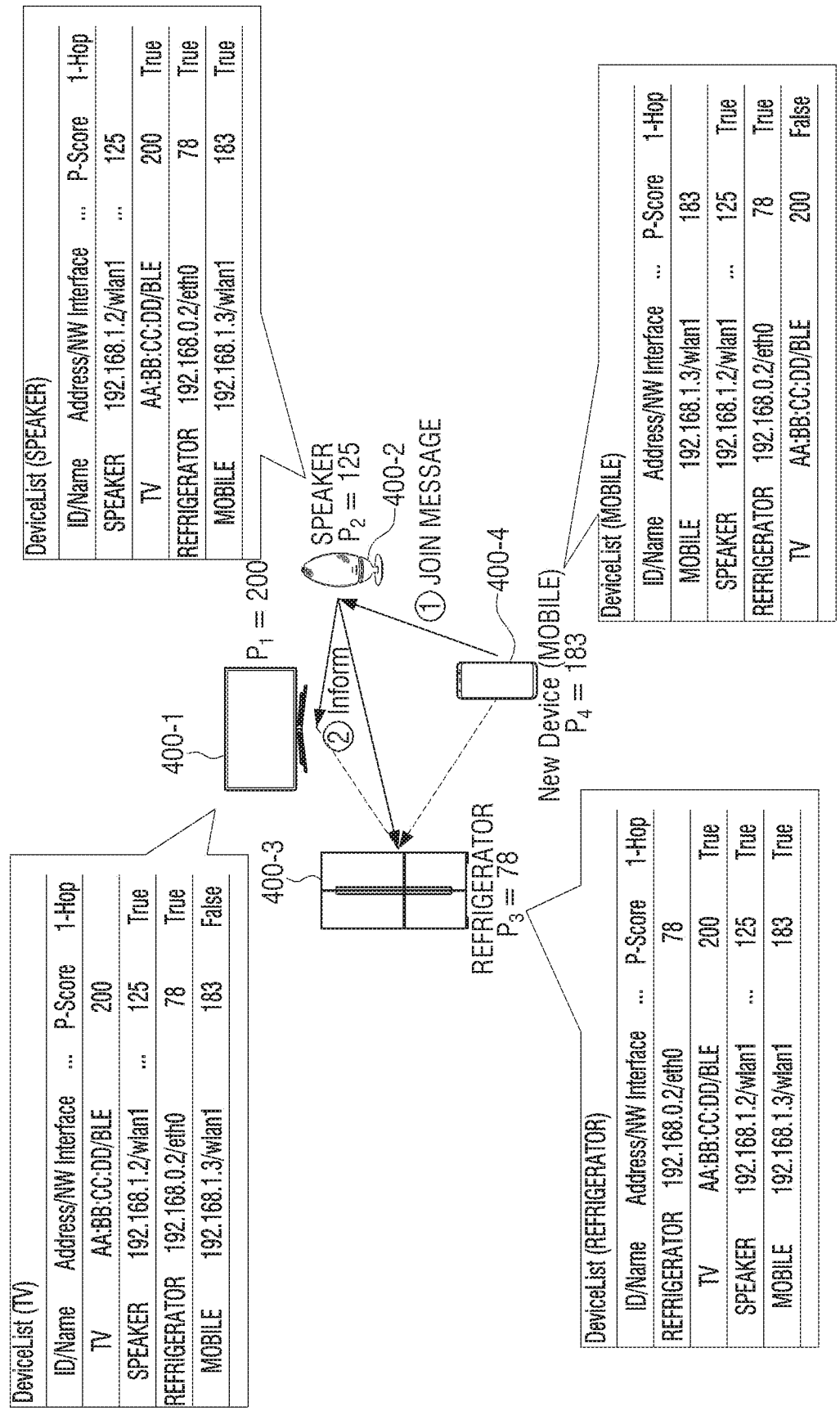
FIG. 5 illustrates a method for sharing performance information among a plurality of terminal devices according to an embodiment of the disclosure.
Figure 6:
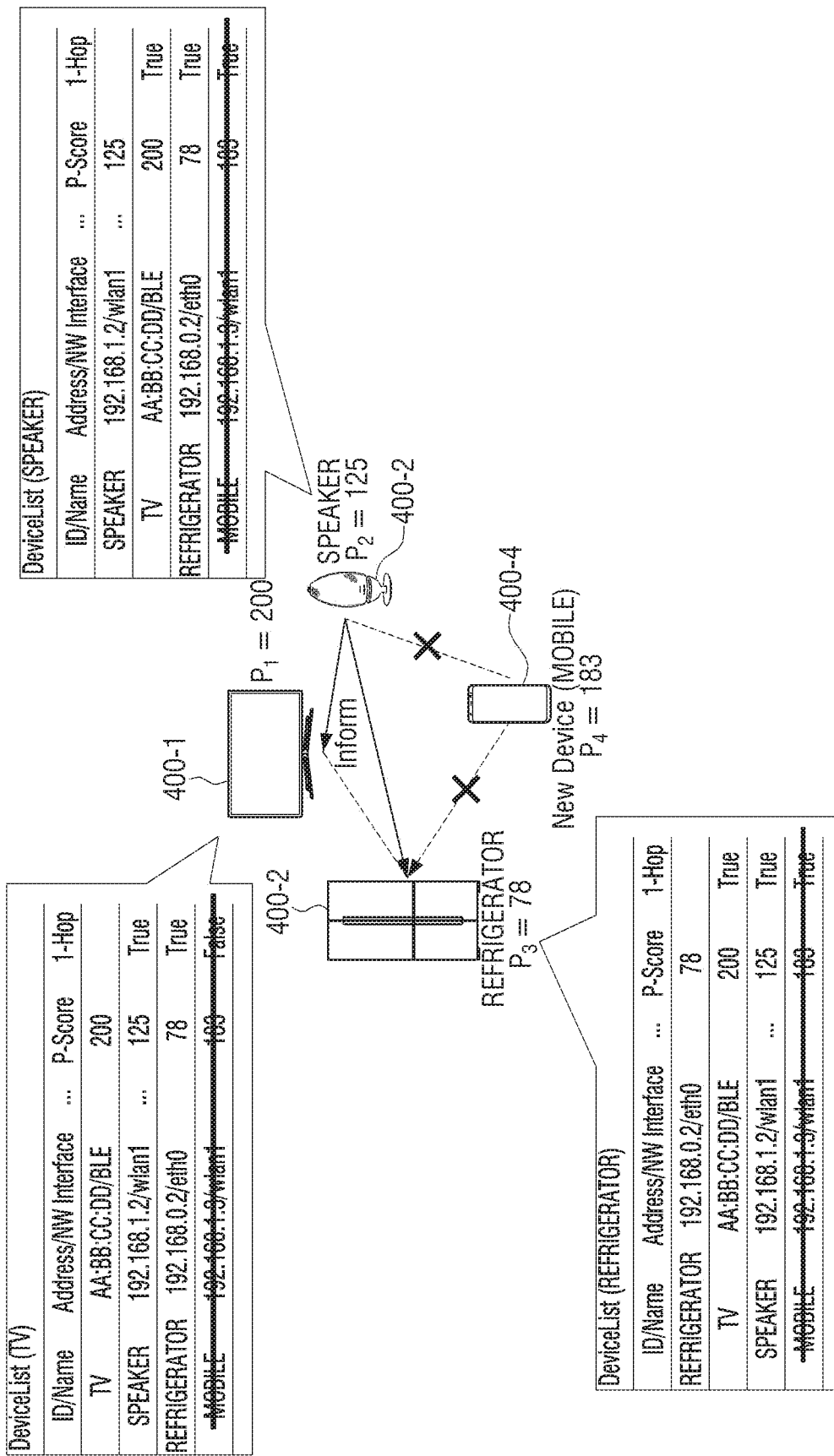
FIG. 6 illustrates a method for sharing performance information among a plurality of terminal devices according to an embodiment of the disclosure.

FIGS. 4, 5, and 6 illustrate a method for sharing performance information among a plurality of terminal devices according to an embodiment of the disclosure.

Specifically, FIG. 4 illustrates a method of sharing performance information when a new device accesses a voice recognition system. Here, a TV 400-1, a speaker 400-2, and a refrigerator 400-3 are already connected to the network and may be in a state of sharing information with each other.

Referring to FIG. 4, when a new terminal device 400-4 accesses a network, the new terminal device 400-4 may transmit an information request signal to at least one of a plurality of terminal devices connected to the network in operation S401. In an exemplary embodiment, the new terminal device 400-4 may transmit an information request signal in a multicast method. The new terminal device 400-4 may transmit performance information associated with the new terminal device 400-4 including the P-score to the other terminal device together with the information request signal or separately.

In an exemplary embodiment, the speaker 400-2 and the refrigerator 400-3, which are terminal devices receiving the request from the new terminal device 400-4, may transmit own performance information including the P-score to the new terminal device 400-4 in operations S402 and S403.

The new terminal device 400-4 may request a device list 410 to at least one of the plurality of terminal devices connected to the network in operation S404. In an exemplary embodiment, the device list 410 may be a list recording of other terminal devices capable of communicating. The new terminal device 400-4 may request the device list 410 to all of the one or more other terminal devices that transmit the performance information, or request the device list 410 to the one or more other terminal devices having the highest performance based on the performance information received from the one or more other terminal devices. Although it has been described above that the device list 410 is requested after receiving the performance information, the device list 410 may be requested simultaneously in an exemplary embodiment.

The new terminal device 400-4 may receive the device list 410 of the speaker from the speaker 400-2 which is the other terminal device in operation S405. For example, the device list 410 of the speaker may include information associated with the one or more other terminal devices capable of communicating with the speaker 400-2. Therefore, the device list 410 may include information associated with the one or more other terminals device not communicating with the new terminal device 400-4.

As an embodiment, in FIG. 4, information associated with the TV 400-1 that communicates with the speaker 400-2 in the device list 410 of the speaker but does not communicate with the new terminal device 400-4 may be included. Accordingly, the new terminal device 400-4 may acquire information associated with the one or more other terminal devices not directly communicating with each other.

The device list 410 may include information on ID, name, address, performance information (P-score), direct communication (1-Hop), or the like.

Accordingly, as shown in FIG. 5, each of the plurality of terminal devices 400-1 to 400-4 connected to the network may share information of the one or more other terminal devices. Each of the plurality of terminal devices 400-1 to 400-4 may identify an edge device among the plurality of terminal devices 400-1 to 400-4 based on the shared performance information.

Referring to FIG. 5, each of the plurality of terminal devices 400-1 to 400-4 may identify the TV 400-1 having the highest P-score as an edge device.

In an exemplary embodiment, each of the plurality of terminal devices 400-1 to 400-4 may update the shared performance information if the predetermined condition is satisfied. For example, each of the plurality of terminal devices 400-1 to 400-4 may update the shared performance information according to a predetermined cycle or update the shared performance information when the new terminal device 400-4 requests performance information. In an exemplary embodiment, each terminal device may identify a new edge device based on the updated performance information. For example, each terminal device may identify a new edge device each time the performance information is updated, and if there is a terminal device having a P-score higher than the P-score of the terminal device identified as the current edge device, may identify the terminal device having a higher P-score as a new edge device.

Alternatively, as shown in FIG. 6, when the new terminal device 400-4 that is connected to the network is out of communication with the voice recognition system, the shared performance information can be updated. For example, each of the plurality of terminal devices 400-1 to 400-3 can delete information about the new terminal device 400-4 that is out of communication with the voice recognition system from the device list 410.

When the edge device is out of communication with the voice recognition system, each terminal device may identify a new edge device based on the shared performance information.

FIGS. 4, 5, and 6 merely illustrate an embodiment of identifying an edge device based on performance information of a plurality of terminal devices, but in various embodiments, an edge device may be identified through input of a manipulation to select an edge device by a user.

In consideration of the disabled state of the identified edge device the next-ranked edge device candidates can be selected together at the time of identifying the edge device. In an exemplary embodiment, the next-ranked edge device candidate may be a terminal having second highest score based on the performance information, or may be identified by the user's selection. Accordingly, when the identified edge device is in the disabled state such as power-off or failure, the automatically determined next-ranking edge device candidate may be changed to the edge device without performing the edge device identification process again.

Figure 7:
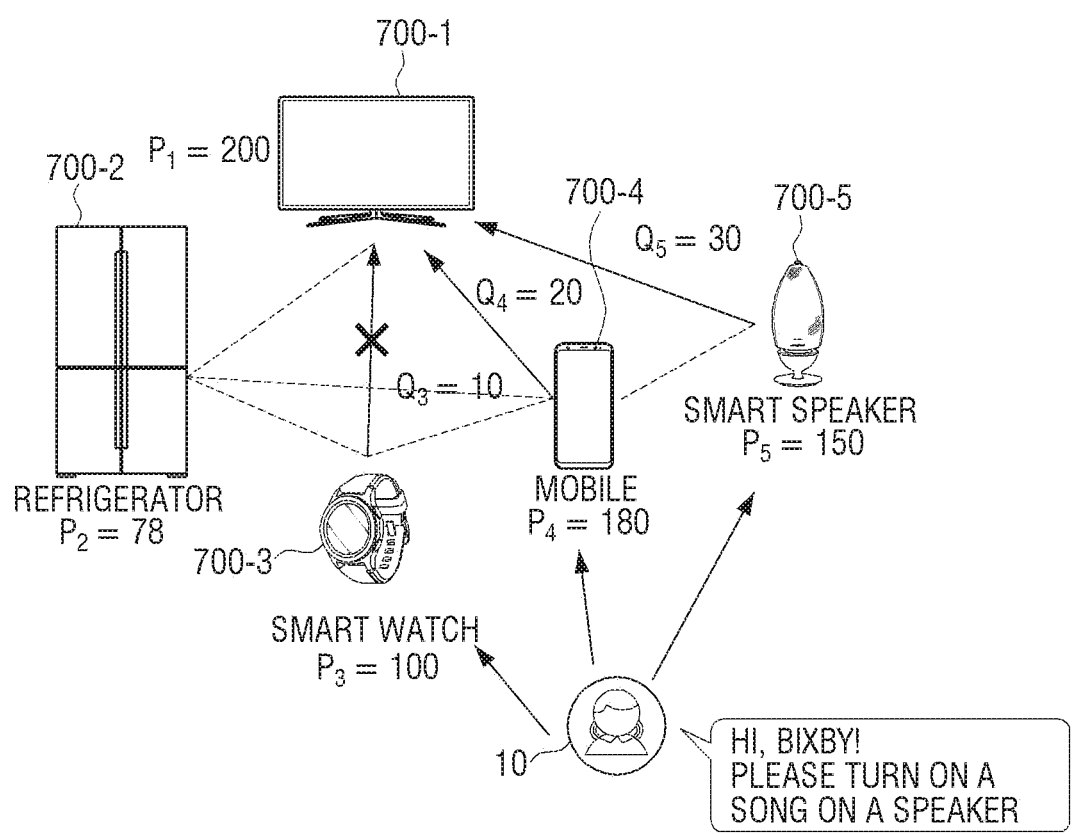
FIG. 7 illustrates an embodiment for determining a terminal device, from among terminal devices which receive voice including a triggering word or phrase, to perform voice recognition according to an embodiment of the disclosure.

FIG. 7 illustrates an embodiment for determining a terminal device to perform voice recognition among terminal devices receiving a voice including a triggering word or phrase according to an embodiment of the disclosure.

First, FIG. 7 illustrates an embodiment in which the TV 700-1 having the highest P-score of 200 may be identified as an edge device in accordance with performance information sharing among a plurality of terminal devices 700-1 to 700-5 (e.g., TV 700-1, refrigerator 700-2, smart watch 700-3, mobile device 700-4, and smart speaker 700-5) connected to the network.

Referring to FIG. 7, when the user 10 utters the triggering phrase "Hi, Bixby", a smart watch 700-3, a mobile device 700-4, and a smart speaker 700-5, from among the plurality of terminal devices 700-1 to 700-5 may receive the sound wave generated by the user including the triggering phrase.

In an exemplary embodiment, each of the smart watch 700-3, the mobile device 700-4, and the smart speaker 700-5 that has received the sound wave including the triggering phrase may acquire information on the reception quality of the sound wave based on at least one of a microphone performance, a volume of the received sound wave, a rate of change of the volume of the received sound wave, the sound pressure, and the distance prediction with the user that generated the sound wave. In an exemplary embodiment, the information associated with the reception quality may include a Q-score indicating the reception quality of the sound wave.

Each terminal device that has received the sound wave including the triggering phrase can transmit information on the obtained reception quality to the TV 700-1 which is the edge device. If the acquired voice reception quality is less than a predetermined level, the terminal device that has received the sound wave including the triggering word can discard or disregard the information associated with the reception quality without transmitting the information to the edge device. For example, if the predetermined reference value of the Q-score for the reception quality is 15, as shown in FIG. 7, the smart watch 700-3 having the acquired Q-score which is less than 15 may delete the information associated with the reception quality, without transmitting the reception quality information to the TV 700-1 which is the edge device.

The TV 700-1 which receives the reception quality information from the mobile device 700-4 and the smart speaker 700-5 as one or more other terminal devices may determine a device for performing voice recognition based on performance information of the mobile device 700-4 and the smart speaker 700-5 and reception quality information. In an exemplary embodiment, the meaning of performing voice recognition may be an operation of transmitting an electrical signal corresponding to the received sound wave to the server for voice recognition, or an operation of performing voice recognition by the terminal itself.

In an exemplary embodiment, the TV 700-1 which is the edge device may determine a device to perform voice recognition using at least one of a P-score, which is a score for performance information, and a Q-score, which is a score for reception quality. The edge device can reflect the weight to each of the P-score and the Q-score and then add the sum, which may vary according to the embodiment. For example, if the voice recognition is performed by the device receiving the sound wave generated by the user, the performance information is also important. Therefore, the weight of the P-score may be increased. If voice recognition is performed in an external server, only reception quality may be important and the weight of the P-score may be lower.

The edge device which determines a device to perform voice recognition based on performance information and reception quality may transmit a voice recognition execution command to the determined terminal device.

For example, if the weights of the P-score and the Q-score are respectively 1, the TV 700-1 may transmit the voice recognition execution command to the mobile device 700-4 having the highest sum of the P-score and the Q-score. The mobile device 700-4 receiving the voice recognition execution command can perform voice recognition on the portion of the sound wave following the triggering word or phrase. For example, the mobile device 700-4 may transmit a sound wave including the phrase "Please turn on a song on a speaker", which is provided after a sound wave including the triggering phrase "Hi, Bixby" is received, to a server for voice recognition, or perform voice recognition by itself.

In the above description, the TV 700-1, which is the edge device, can recognize a sound wave including the triggering word or phrase, and the TV 700-1 as the edge device may be determined as a voice recognition performing device, according to the embodiment. Various embodiments of the voice recognition subject will be described in detail with reference to FIGS. 8, 9, 10, 11, and 12.

Meanwhile, according to the embodiment, information on the reception quality can be transmitted to the edge device at a predetermined cycle. For example, when the user 10 generates a sound wave while moving, the plurality of terminal devices receiving the sound wave of the user 10 may transmit information on the reception quality associated with the received sound wave to the edge device in a predetermined cycle. Accordingly, the device for performing voice recognition may be changed during the duration of the sound wave.

Specifically, when the reception quality of the terminal device determined as a device performing voice recognition is degraded, the edge device may change the terminal device to perform voice recognition. For example, the plurality of terminal devices receiving the sound wave generated by the user 10 may transmit information on the reception quality to the edge device at a predetermined cycle, or if the second score of the terminal device which is determined as a device to perform voice recognition is reduced to less than a predetermined value, the edge device may request information on the reception quality to the plurality of terminal devices which receive the electrical signal associated with the sound wave generated by the user 10 and receive information on the reception quality of the plurality of terminal devices receiving the voice of the user 10. At this time, the edge device can change the terminal device having the highest second score among the plurality of terminal devices to a device for performing voice recognition.

That is, voice recognition of the sound wave that is generated prior to a change of the terminal device to perform voice recognition is performed by the terminal device before change, and a portion of the sound wave received after the change may be recognized by the changed terminal device. For example, the terminal devices for performing voice recognition before change and after change, respectively, may transmit electrical signals associated with the received sound wave to a server or an edge device for voice recognition. According to still another embodiment, if the terminal devices for performing voice recognition before change and after change transmit the received voice to the edge device respectively, the edge device may stitch the received portions of the sound wave into one sound wave, transmit the stitched one sound wave to a server for voice recognition, or the edge device may directly perform voice recognition. In an exemplary embodiment, the edge device may transmit information associated with a device to perform an operation corresponding to voice recognition to the server, taking account of accounts of terminal devices that have transmitted the electrical signals corresponding to the received sound wave.

As described above, even if the sound wave generated by the user is received at a plurality of terminal devices, only one device performs voice recognition, unnecessary resource consumption can be reduced, and conflict among devices in performing an operation with respect to a user's voice command may be prevented.

Figure 8:
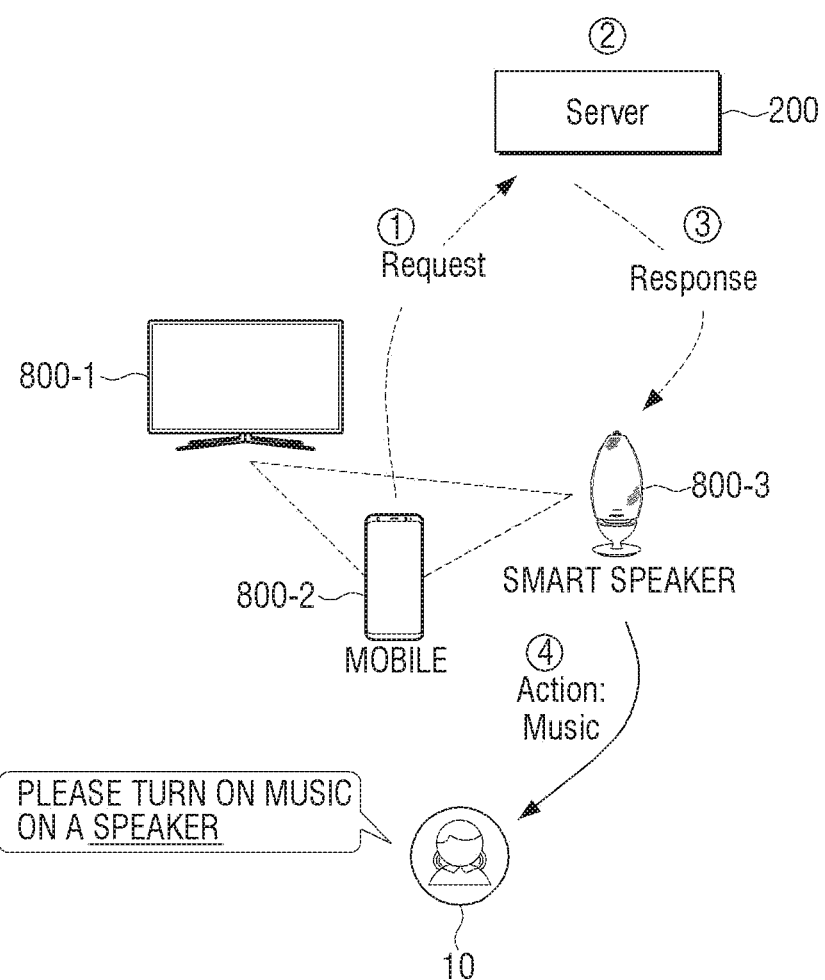
FIG. 8 illustrates various embodiments of performing voice recognition by a server according to an embodiment of the disclosure.
Figure 9:
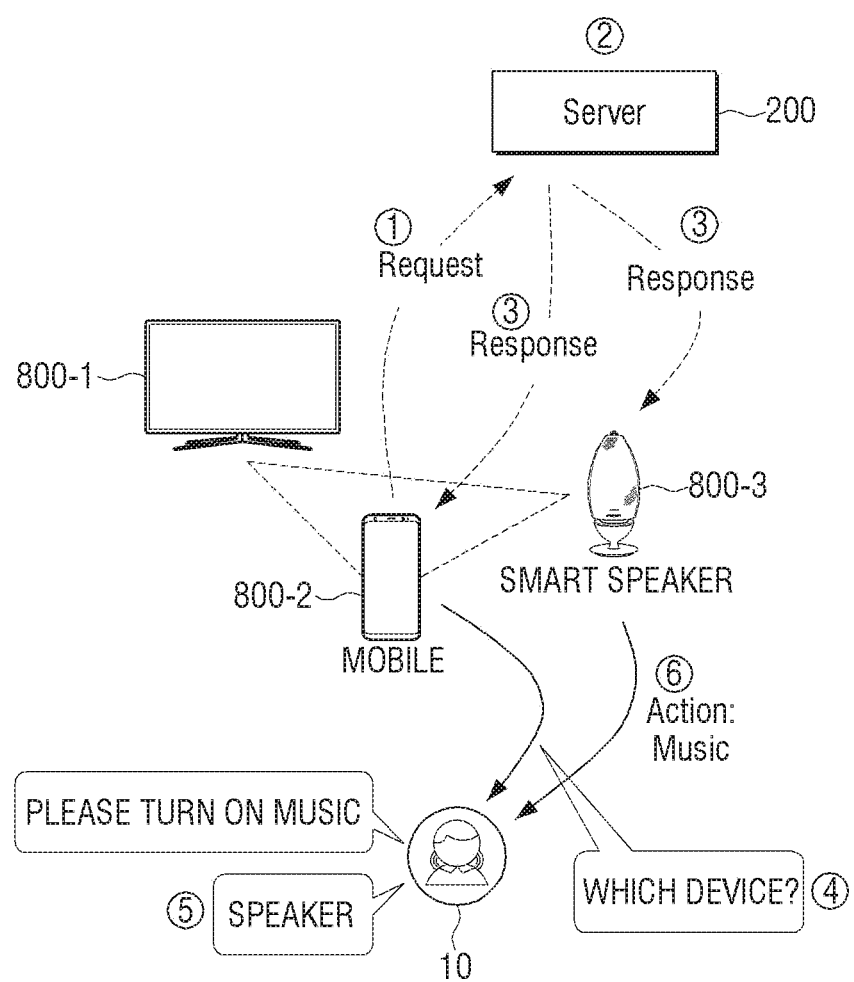
FIG. 9 illustrates various embodiments of performing voice recognition by a server according to an embodiment of the disclosure.

FIGS. 8 and 9 are views for describing various embodiments in which voice recognition is performed by a server according to an embodiment of the disclosure.

FIGS. 8 and 9 illustrate that the TV 800-1 having the highest P-score is identified as the edge device in accordance with sharing of performance information of a plurality of terminal devices 800-1 to 800-3 connected to the network, and the mobile device 800-2 is determined as a device to perform voice recognition by the TV 800-1.

Referring to FIG. 8, the mobile device 800-2 receiving the portion of the sound wave after the triggering word or phrase "Turn on the music on the speaker", may transmit the electrical signal corresponding to the received sound wave to the server 200 for perform voice recognition (①).

The server 200 may perform voice recognition on the received electrical signal corresponding to the sound wave to determine a terminal device to generate an operation execution command and perform an operation command corresponding to the sound wave (②). For example, as a result of voice recognition, the server 200 may determine a smart speaker 800-3 as a terminal device to generate a music reproduction command and perform the operation command. The server 200 may transmit the generated operation execution command to the smart speaker 800-3 (③).

The smart speaker 800-3 receiving the operation command from the server 200 can perform an operation corresponding to the received command (④). For example, the smart speaker 800-3 can reproduce music based on the received reproduction command.

While the user 10 has generated a sound wave including the subject of the operation, if the user 10 further says "please turn on the music", the server 200 may determine a terminal device to perform an operation command based on various criteria. For example, a terminal device having the closest distance from the user 10 or a terminal device with the best audio output performance may be determined as a device to perform an operation command, and an operation command may be transmitted.

As illustrated in FIG. 9, when a plurality of terminal devices is determined as terminal devices to perform an operation command, a device to perform a final operation may be determined according to a user's selection.

Referring to FIG. 9, the server 200 may perform voice recognition on the electrical signal associated with received sound wave generated by the user 10 (①) from the mobile device 800-2 (②). As a result of performing voice recognition, if it is determined that voice recognition is performed by a plurality of terminal devices, the server 200 may transmit an operation execution command to the determined plurality of terminal devices 800-2 and 800-3 (③).

In this case, the user 10 can be requested to select one of the plurality of terminal devices 800-2 and 800-3 (④). For example, the terminal device requesting the user 10 to select one device may be at least one of the plurality of terminal devices 800-2 and 800-3.

If the user 10 selects one device according to the selection request ((5)), the selected device can perform an operation command corresponding to the sound wave generated by the user ((6)). For example, when the user 10 selects the smart speaker 800-3 among the mobile device 800-2 and the smart speaker 800-3 which receive the operation execution command, the selected smart speaker 800-3 may reproduce music according to the received operation command.

In the above description, it is described that the server 200 transmits an operation execution command to a plurality of the determined terminal devices 800-2 and 800-3. However, in an alternative embodiment, if it is determined that the plurality of terminal devices perform voice recognition, the server 200 may transmit a command for the terminal device selection request to the device 800-2 that has transmitted the voice signal, and if the device 800-2 that has transmitted the electrical signal associated with the received sound wave transmits a response to the user's selection to the server 200, the server 200 may be configured to transmit an operation execution command to the selected terminal device.

Hereinabove, an embodiment of performing a voice recognition operation regarding the received voice is performed by an external server is described. Hereinbelow, an embodiment of performing a voice recognition by a terminal device will be described.

Figure 10:
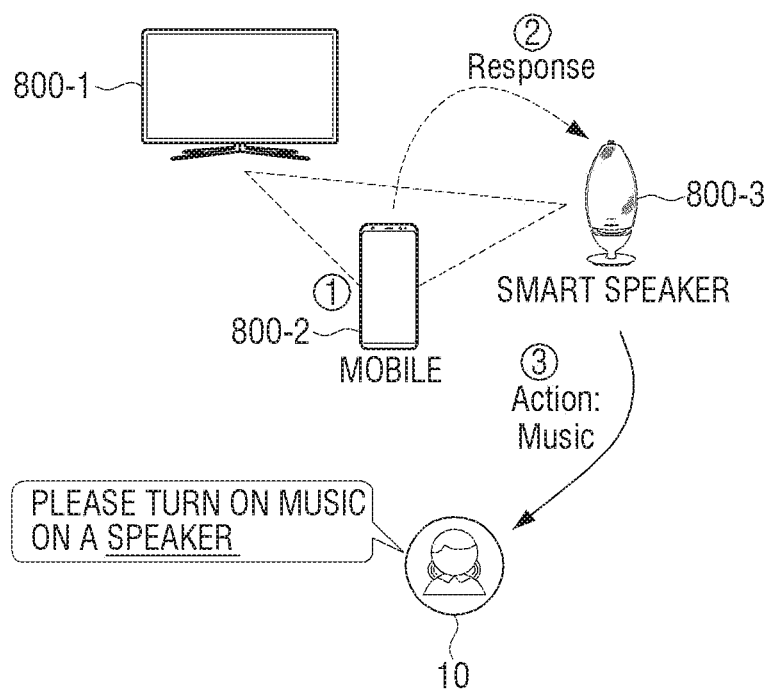
FIG. 10 illustrates an embodiment of performing voice recognition by a terminal device determined by an edge device according to an embodiment of the disclosure.

FIG. 10 is a view for describing an embodiment in which voice recognition is performed by the terminal device determined by the edge device according to an embodiment of the disclosure.

FIG. 10 illustrates an embodiment after the TV 800-1 having the highest P-score is identified as the edge device in accordance with sharing of performance information of the plurality of terminal devices 800-1 to 800-3 connected to the network, and the mobile device 800-2 is determined as a device for performing voice recognition by the TV 800-1.

Referring to FIG. 10, the mobile device 800-2 which receives the sound wave corresponding to the phrase "please turn on music on the speaker", which is a sound wave received after a triggering word or phrase is uttered by the user 10, may perform voice recognition regarding the received sound wave ((1)).

Specifically, the mobile device 800-2 may perform voice recognition on the received sound wave and determine a terminal device to generate an operation execution command corresponding to a sound wave and perform an operation command. For example, the mobile device 800-2 may generate a music reproduction command in accordance with the intention of the user 10 as a result of voice recognition, and determine the smart speaker 800-3 as the terminal device to perform the operation command. Then, the mobile device 800-2 may transmit the generated operation execution command to the smart speaker 800-3 ((2)).

The smart speaker 800-3 receiving the operation command from the mobile device 800-2 can perform an operation corresponding to the received command ((3)). For example, the smart speaker 800-3 may reproduce music based on the received reproduction command.

In the above description, the user 10 has generated the sound wave including the subject of performing the operation, but if the user generates a sound wave corresponding to the phrase "please turn the music", the mobile device 800-2 may determine the terminal device to execute the command based on various criteria. For example, a terminal device having the closest distance from the user 10 or a terminal device with the best audio output performance may be determined as a device to perform an operation command, and an operation command may be transmitted. Therefore, the mobile device 800-2 that has performed the voice recognition may be determined as a device to execute an operation command. In this case, the mobile device 800-2 may directly provide the user 10 with a response corresponding to the voice recognition result.

In the meantime, if a plurality of terminal devices is determined as the terminal devices to perform the operation command, the mobile device 800-2 may request a user 10 to select a device, and determine a device to perform a final operation.

Figure 11:
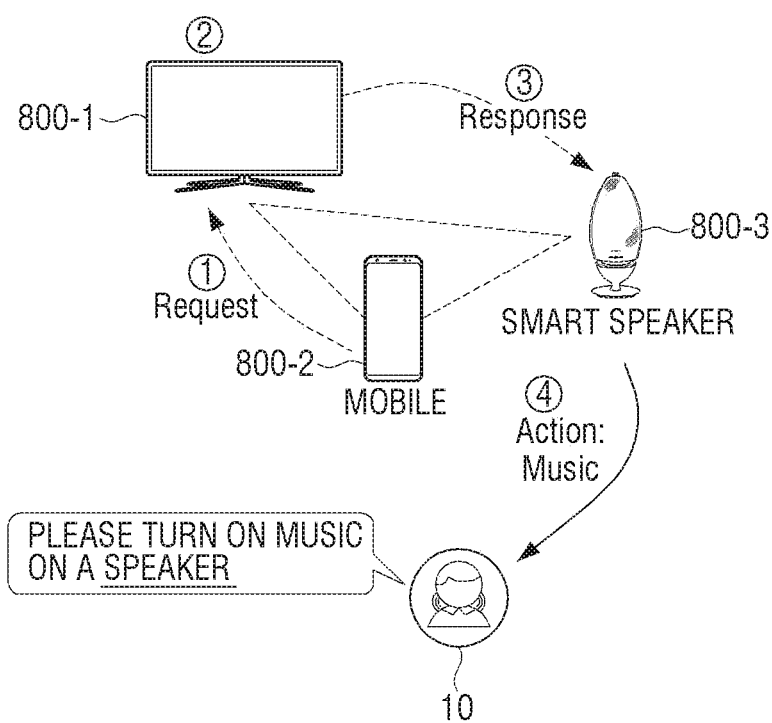
FIG. 11 illustrates an embodiment of performing voice recognition by an edge device according to an embodiment of the disclosure.
Figure 12:
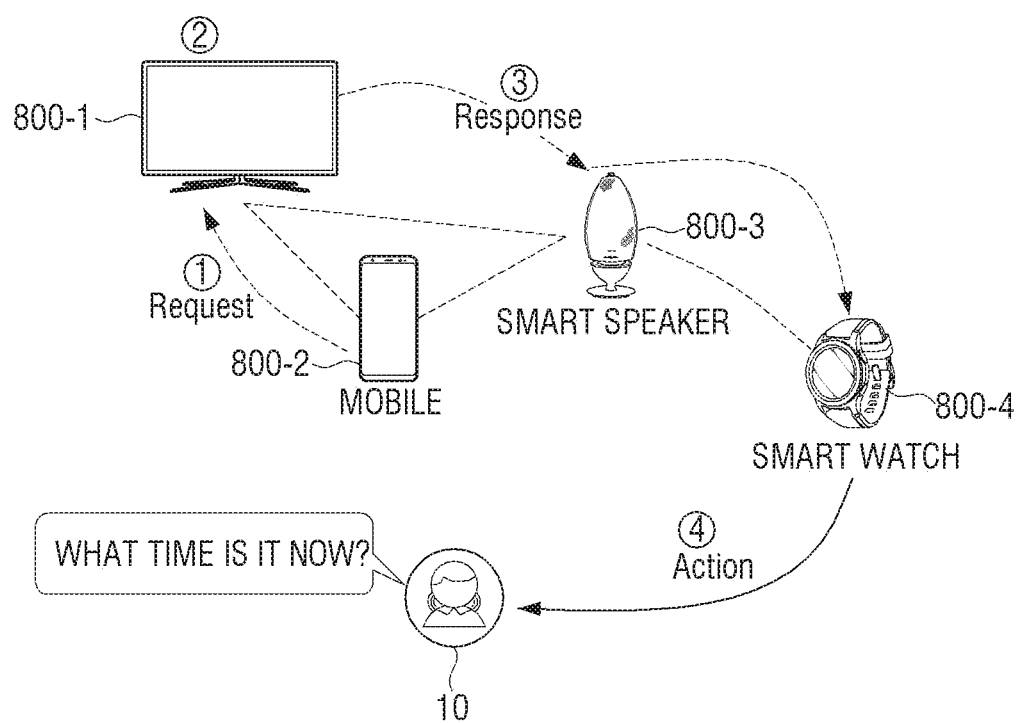
FIG. 12 illustrates an embodiment of performing voice recognition by an edge device according to an embodiment of the disclosure.

FIGS. 11 and 12 illustrate an embodiment in which voice recognition is performed by the edge device according to an embodiment of the disclosure.

First, FIGS. 11 and 12 illustrate an embodiment after the TV 800-1 having the highest P-score is identified as the edge device in accordance with sharing of performance information of the plurality of terminal devices 800-1 to 800-3 connected to the network, and the mobile device 800-2 is determined as a device to perform voice recognition by the TV 800-1.

Referring to FIG. 11, the mobile device 800-2 that has received the sound wave generated by the user after the triggering word or phrase is uttered by the user 10, "Please turn on music on the speaker" may transmit the received voice signal to the TV 800-1, which is the edge device for performing voice recognition ((1)).

The TV 800-1 as the edge device may perform voice recognition of the received sound wave to determine a terminal device to generate an operation command corresponding to the sound wave and to perform an operation command ((2)). For example, the TV 800-1, which is the edge device, may generate a music reproduction command in accordance with the utterance intention of the user 10 as a result of voice recognition, and determine the smart speaker 800-3 as a terminal device to perform an operation command. Then, the TV 800-1 as the edge device may transmit the generated operation execution command to the smart speaker 800-3 ((3)).

The smart speaker 800-3 which receives the operation command from the TV 800-1 which is the edge device may perform an operation corresponding to the received command ((4)). For example, the smart speaker 800-3 may reproduce music based on the received reproduction command.

In the above description, the user 10 has generated a sound wave including the subject of the operation, but when the user 10 generates a sound wave associated with the phrase "turn on the music", the TV 800-1, which is the edge device, may determine a terminal device to perform an operation command. For example, a terminal device having the closest distance from the user 10 or a terminal device with the best audio output performance may be determined as a device to execute an operation command, and an operation command may be transmitted. Therefore, the TV 800-1, which is the edge device, may be determined as a device to perform an operation command. In this case, the TV 800-1 as the edge device can directly provide the user 10 with a response corresponding to the voice recognition result.

When the plurality of terminal devices is determined as the terminal devices to perform an operation command, the mobile device 800-2 may request the user 10 to select a device and determine a device to perform final operation according to selection of the user 10.

When the terminal device 800-4 to perform the operation command corresponding to the sound wave generated by the user 10 determined by the TV 800-1 as the edge device is not a terminal device directly communicating with the TV 800-1 as the edge device, as illustrated in FIG. 12, an operation execution command may be transmitted to the terminal device 800-3 which is connected to both the TV 800-1 which is the edge device and the terminal device 800-4 to perform the operation command.

This operation may be possible by sharing information of each terminal device. The operation of FIG. 12, when the mobile device 800-2 performing voice recognition determines a terminal device to perform an operation command, may be applied to a case where a terminal device not directly communicating with the mobile device 800-2 is determined as a device to perform an operation execution command.

Figure 13:
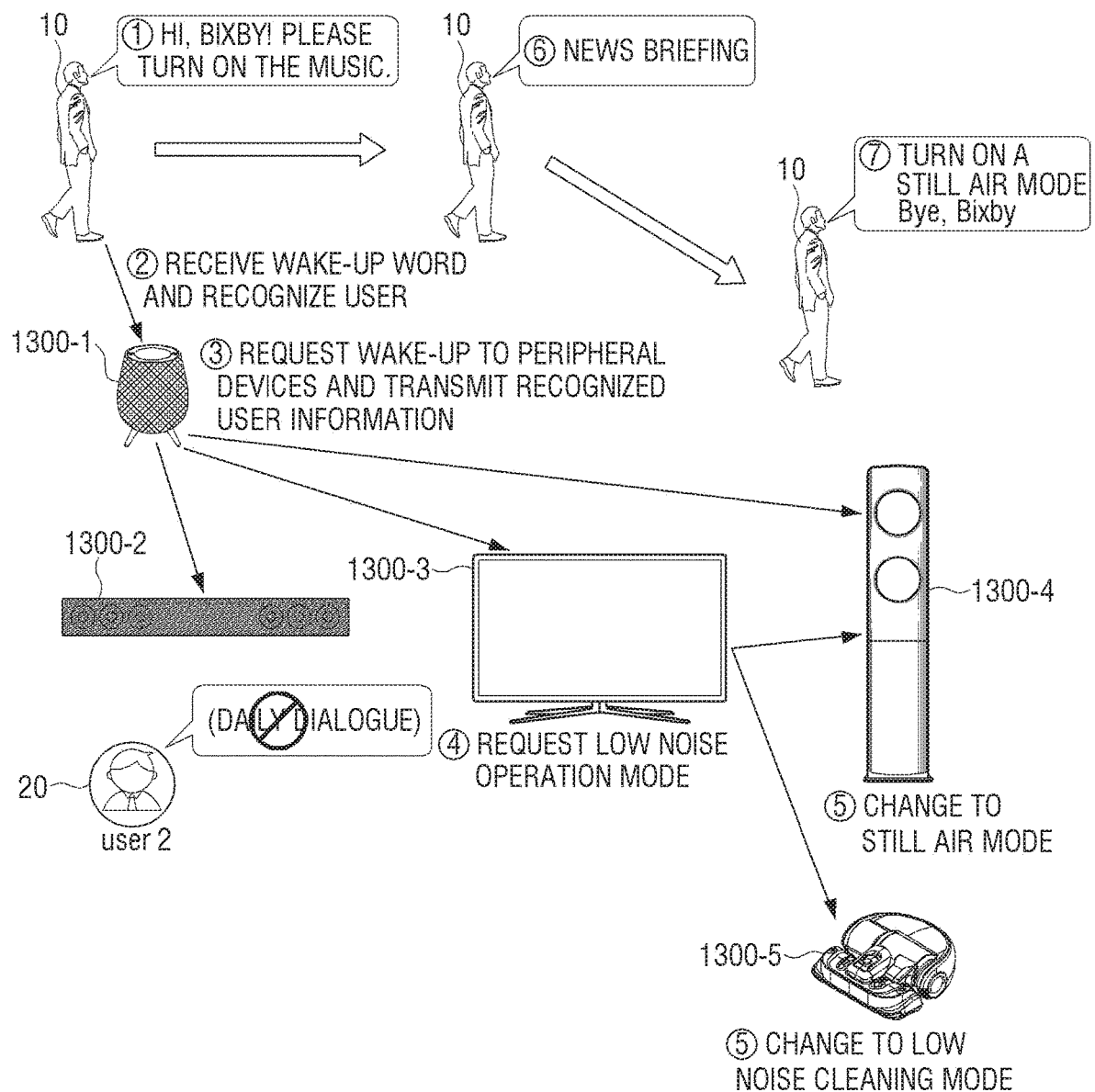
FIG. 13 illustrates an embodiment of changing a device to receive a sound wave for voice recognition when a user utters voice while moving according to an embodiment of the disclosure.

FIG. 13 illustrates an embodiment of changing a device to receive a sound wave for voice recognition when a first user 10 utters the sound wave while moving according to an embodiment of the disclosure.

Referring to FIG. 13, when the first user 10 generates a sound wave including a triggering word or phrase (e.g., wake-up word or phrase) (①) and a first terminal device 1300-1 receives the sound wave generated by the user, the first terminal device 1300-1 may be activated according to the reception of the sound wave including the triggering word, and may recognize the speaker (e.g., the user that generated the sound wave) of the received sound wave (②). In an exemplary embodiment, the first terminal device 1300-1 may be one terminal device that has received the voice of the first user 10, or a selected terminal device that has acquired the sound wave for voice recognition among a plurality of terminal devices that have received the sound wave generated by the user.

Thereafter, when the sound quality of the sound wave received by the first terminal device 1300-1 is reduced, the first terminal device 1300-1 may transmit a wake-up request to peripheral devices 1300-2 to 1300-4. In an exemplary embodiment, the sound quality of the sound wave received at the first terminal device 1300-1 may be reduced due to the movement of the first user 10.

Then, the first terminal device 1300-1 may transmit the information associated with the recognized sound wave together with the activation request (③). Accordingly, even if a sound wave generated by a second user 20 is recognized in the activated second terminal device 1300-2, the second terminal device 1300-2 may not perform the operation for the voice recognition of the second user 20.

In an exemplary embodiment, after the peripheral devices 1300-2 to 1300-4 are activated, the peripheral devices may transmit a control command to minimize an operation noise to at least some terminal devices from among the peripheral devices to minimize noise of a surrounding environment.

For example, when the noise of the surrounding environment is equal to or greater than a preset value, the activated third terminal device 1300-3 may request a low noise operation mode to the fourth terminal device 1300-3 and the fifth terminal device 1300-5 having a big operation noise (④). Accordingly, the fourth terminal device 1300-4 (e.g., an air conditioner) may be changed to a silent or still air mode and the fifth terminal device 1300-5 (e.g., a robot cleaner) may be changed to the low noise cleaning mode (⑤).

When noise of a surrounding environment is less than a preset value, the activated third terminal device 1300-3 may omit an operation to request a low noise operation mode to other terminal devices.

Thereafter, when the first user 10 generates a sound wave associated with the phrase "news briefing" (⑥), from among the first terminal device 1300-1 which is a smart speaker capable of news briefing operation among the terminal devices 1300-1 to 1300-4 receiving the sound wave generated by the first user 10 and the third terminal device 3 1300-3 which is a smart TV, the smart TV 1300-3 having good reception quality may perform an operation corresponding to sound wave and voice recognition of the first user 10.

When the first user 10 generates a sound wave associated with the phrase "Turn on a still air mode" (⑦)", among the terminal devices 1300-1 to 1300-4 receiving the sound wave generated by the first user 10, the fourth terminal device 1300-4 capable of operating in still air mode may perform an operation corresponding to the voice recognition based on the sound wave generated by the first user 10.

When the reception quality of the sound wave received by the fourth terminal device 1300-4 activated by the first terminal device 1300-1 is less than a preset value as the first user 10 generates the sound wave while moving, the fourth terminal device 1300-4 may transmit the information on the recognized utterance and/or the recognized user together with the activation request to the peripheral terminal devices.

As described above, by receiving the triggering word or phrase and requesting the activated terminal device to activate the peripheral terminal devices in accordance with the movement of the first user, the first user 10 may control various devices with voice commands without repeatedly uttering the triggering word or phrase, thereby improving convenience of a user recognition performance and voice recognition performance.

If the first user 10 does not utter the triggering word for deactivating the voice recognition function of the terminal device or does not generate a sound wave for a predetermined time, the terminal device may terminate the voice recognition function. For example, if the first user 10 utters a triggering word or phrase for deactivating the voice recognition function such as "Bye, Bixby" or does not generate a sound wave over a predetermined time, the terminal can end the voice recognition function.

Figure 14:
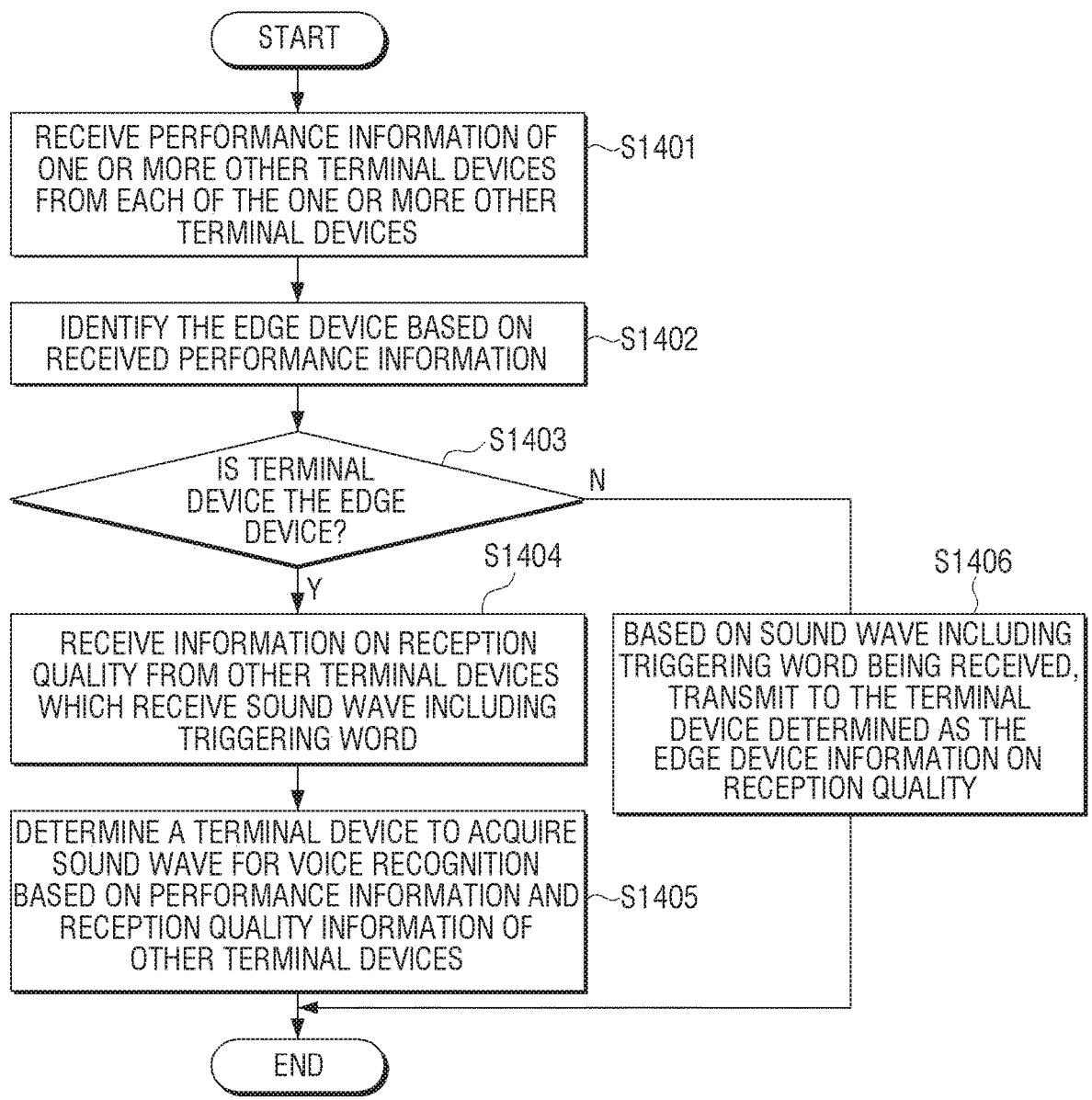
FIG. 14 is a flowchart illustrating a controlling method of a terminal device according to an embodiment of the disclosure; and, FIG. 15 is a sequence diagram illustrating a specific operation of the voice recognition system according to an embodiment of the disclosure.

FIG. 14 is a flowchart to describe a controlling method of a terminal device according to an embodiment of the disclosure.

Referring to FIG. 14, a terminal device may receive performance information of one or more other terminal devices from each of the one or more other terminal devices in operation S1401. In an exemplary embodiment, the received performance information may include information about a terminal device that is in communication with the other terminal device but does not communicate with the terminal device.

The terminal device may identify the edge device based on the received performance information in operation S1402. For example, the edge device may be a device for determining a device to perform voice recognition among a plurality of terminal devices. The edge device may be determined in consideration of processing performance, computing performance, movement status, or the like.

If the terminal device is identified as the edge device according to the aforementioned criteria in operation S1403-Y, the terminal device may receive, from other terminal devices receiving the triggering word, information on the reception quality in operation S1404.

The terminal device may determine a terminal device to acquire a sound wave generated by a user for voice recognition based on performance information of the other terminal device and information on the reception quality in operation S1405. In an exemplary embodiment, the terminal device for performing voice recognition may be a device for acquiring a sound wave generated by a user for voice recognition. The terminal device may transmit a voice recognition execution command to the one or more other terminal devices determined to perform voice recognition.

When the terminal device is not the edge device in operation S1403-N, if the terminal device receives a sound wave including the triggering word or phrase, information associated with the reception quality of the sound wave can be transmitted to the terminal device determined as the edge device in operation S1406. For example, the information associated with the voice reception quality may be obtained based on the received sound wave generated by the user. In an exemplary embodiment, if the voice reception quality is less than the preset level, the terminal device can discard the information associated with the reception quality of the sound wave without transmitting the information associated with the reception quality of the sound wave to the edge device.

Thereafter, upon receiving a voice recognition command from the edge device, the terminal device can perform voice recognition on the sound wave after the sound wave following the triggering word or phrase. For example, voice recognition may refer to an operation of transmitting a received sound wave generated by a user to a server for voice recognition or an operation of the terminal device performing voice recognition to determine the user's intention associated with the sound wave.

As described above, even though a plurality of terminal devices has received the sound wave generated by the user, a single device determined by the edge device may perform voice recognition, and accordingly, unnecessary resource consumption may be reduced and collision between devices in performing an operation on a command included in the sound wave generated by the user may be prevented.

Figure 15:
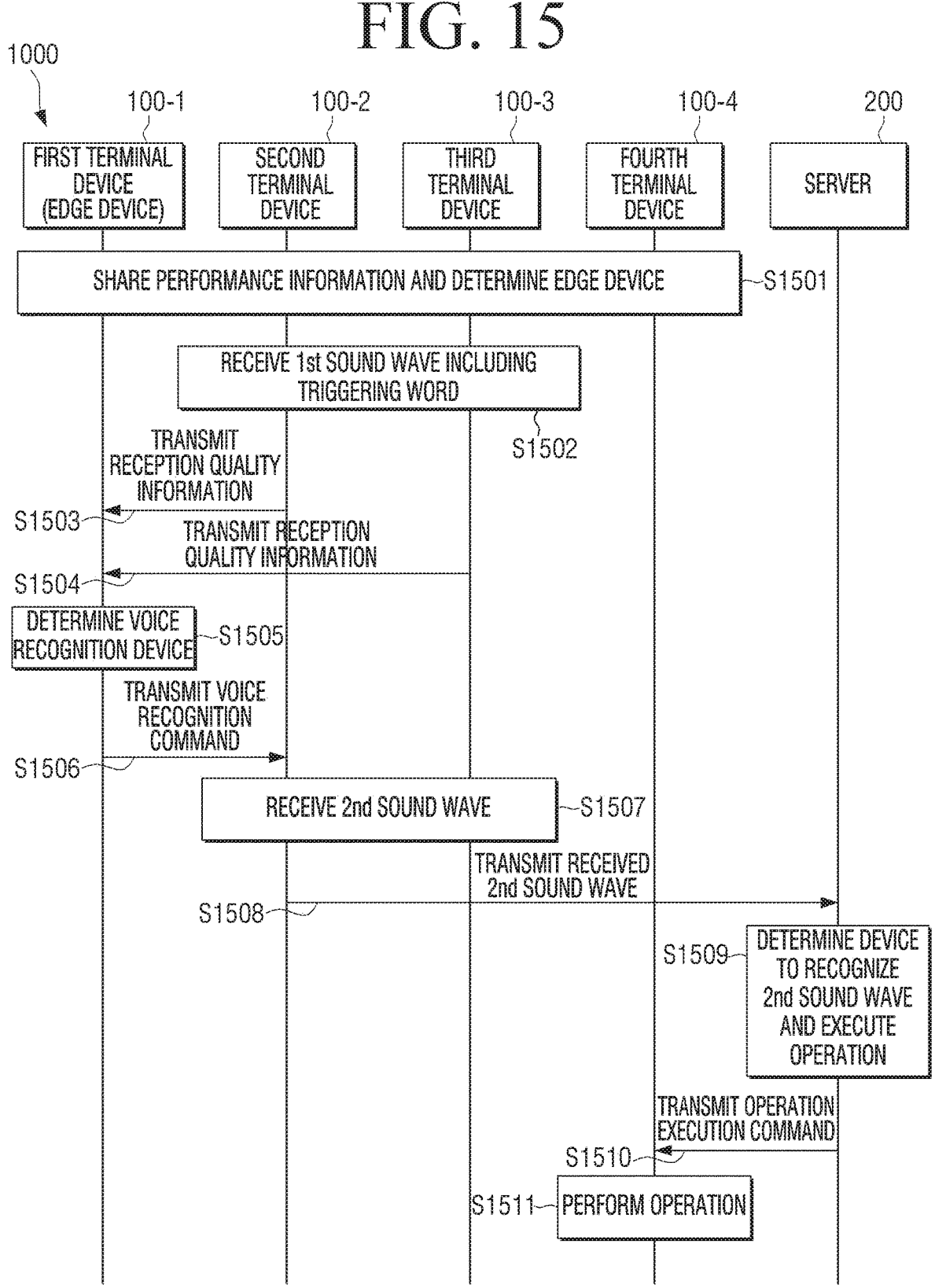

FIG. 15 illustrates an operation of the voice recognition system according to an embodiment of the disclosure.

Referring to FIG. 15, the voice recognition system 1000 of the disclosure may include the plurality of terminal devices 100-1 to 100-4 and the server 200. In an exemplary embodiment, the server 200 may include a configuration to determine the user's intention through voice recognition. If voice recognition is possible by the terminal device, the server 200 may be omitted.

The plurality of terminal devices 100-1 to 100-4 in the voice recognition system 1000 may share performance information and determine the edge device in operation S1501. In FIG. 15, the first terminal device 100-1 is the edge device.

Thereafter, when a sound wave generated by the user including the triggering word or phrase is received by at least one of the plurality of terminal devices 100-1 to 100-4, the at least one terminal device that has received the sound wave including the triggering word may transmit the reception quality information associated with the received sound wave to the edge device 100-1. In an exemplary embodiment, the reception quality information may be a Q-score obtained by at least one terminal device that has received the sound wave including the triggering word or phrase, and may be the received sound wave. In an exemplary embodiment, the score for the reception quality of each terminal device may be calculated by the edge device.

For example, when the second terminal device 100-2 and the third terminal device 100-3 of the plurality of terminal devices 100-1 to 100-4 receive the sound wave generated by the user including the triggering word or phrase in operation S1502, the second terminal device 100-2 and the third terminal device 100-3 may transmit the reception quality information to the edge device 100-1 in operations S1503, S1504.

The first terminal device 100-1 as the edge device may determine the voice recognition device based on the information on the received voice reception quality in operation S1505. For example, the voice recognition device may be a device for acquiring a sound wave generated by a user for voice recognition. The first terminal device 100-1 as the edge device may transmit a voice recognition command to the terminal device to perform the determined voice recognition. For example, if the second terminal device 100-2 is determined as a terminal device for performing voice recognition, the first terminal device 100-1 may transmit a voice recognition command to the second terminal device in operation S1506.

Even after the sound wave including the triggering word or phrase is received by the second terminal device 100-2 and the third terminal device 100-3 in operation S1507, only the second terminal device 100-2 which receives the voice recognition command may transmit the received sound wave to the server 200 in operation S1508. In FIG. 15, although operations S1502 and S1507, which are first sound wave and second sound wave receiving operations respectively, are shown as separate operations, in actual implementation, the operations may be continuous operations, and operation S1507 may be performed simultaneously with operations S1503 to S1506. For example, S1502 and S1507 may be a single sound wave generated by a user.

The server 200 may perform voice recognition of the received sound wave and may determine a device to perform an operation corresponding to the sound wave in operation S1509. For example, the server 200 may generate an operation command corresponding to the sound wave based on the voice recognition result, and determine the terminal device to perform the operation command.

The server 200 may transmit the generated operation execution command to the terminal device determined to execute the operation command. For example, if the terminal device determined to perform the operation command is the fourth terminal device 100-4, the server 200 may transmit the operation execution command to the fourth terminal device 100-4 in operation S1510. The fourth terminal device 100-4 receiving the operation execution command can perform an operation corresponding to the command in operation S1511.

As described above, even though a plurality of terminal devices have received the sound wave generated by the user, one device determined by the edge device may perform voice recognition, and transmits an operation execution command to only one terminal device according to the result of voice recognition, and thus, unnecessary resource consumption may be reduced, and conflict among devices in performing an operation for a command included in the sound wave generated by the user may be prevented.

Meanwhile, the various embodiments described above can be implemented in a recording medium that can be read by a computer or a similar device using software, hardware, or a combination thereof. In accordance with a hardware implementation, the embodiments described in the disclosure may be implemented using at least one of application specific integrated circuits (ASICs), DSPs, digital signal processing devices (DSPDs), programmable logic devices (PLDs), FPGAs, processors, controllers, microcontrollers, microprocessors, and an electrical unit for carrying out other functions. In some cases, the embodiments described herein may be implemented by the processor itself. According to a software implementation, embodiments such as the procedures and functions described herein may be implemented with separate software modules. Each of the software modules may perform one or more of the functions and operations described herein.

Meanwhile, the method according to various embodiments of the disclosure described above may be stored in a non-transitory readable medium. Such non-transiently readable media may be used in various devices and used.

Non-volatile computer readable medium means a medium that stores data for a short period of time such as a register, a cache, a memory, etc., but semi-permanently stores data and can be read by a device. Specific examples of non-transitory computer readable media include compact disc (CD), DVD, hard disk, Blu-ray disk, USB, memory card, read only memory (ROM), etc.

According to one embodiment, a method according to various embodiments disclosed herein may be provided in a computer program product. A computer program product may be traded between a seller and a purchaser as a commodity. A computer program product may be distributed in the form of a machine readable storage medium (e.g., CD-ROM) or distributed online through an application store (e.g.: PlayStore™). In the case of on-line distribution, at least a portion of the computer program product may be stored temporarily or at least temporarily in a storage medium such as a manufacturer's server, a server in an application store, or a memory in a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal device comprising:
a communication interface comprising communication circuitry; and
a processor configured to:
receive performance information of one or more other terminal devices from each of the one or more other terminal devices through the communication interface,
identify an edge device to determine a terminal device to perform voice recognition from among the terminal device and the one or more other terminal devices based on the performance information received from each of the one or more other terminal devices,
based on the terminal device being identified as the edge device, receive information associated with reception quality from one or more other terminal devices which receive a sound wave including a triggering word from among the one or more other terminal devices which transmit the performance information,
determine a terminal device to acquire the sound wave for voice recognition from based on the received information associated with the reception quality, from among the one or more other terminal devices which receive the sound wave, and
transmit, to the determined terminal device, a command to transmit the sound wave acquired for voice recognition to an external voice recognition device.

2. The terminal device of claim 1,
wherein the performance information received from each of the one or more other terminal devices comprises a first score that is acquired based on performance of the one or more other terminal devices, and
wherein the information associated with reception quality that is received from the one or more other terminal devices which receive the sound wave comprises a second score that represents reception quality associated with the sound wave received by the one or more other terminal devices.

3. The terminal device of claim 2, wherein the processor is further configured to determine a terminal device having a highest second score value, from among the one or more other terminal devices which receive the sound wave, as a terminal device to acquire the sound wave for voice recognition.

4. The terminal device of claim 2, further comprising:
a microphone,
wherein the processor is further configured to:
based on the sound wave including the triggering word being received at the microphone, acquire a second score of the terminal device based on at least a part of the sound wave,
determine a terminal device having a highest second score, from among the terminal device and the one or more other terminal devices which receive the sound wave, as a terminal device to acquire the sound wave for voice recognition, and
based on the terminal device being determined as a terminal device to acquire the sound wave, acquire a portion of the sound wave that is received after the triggering word, and
transmit the acquired portion of the sound wave to an external voice recognition device.

5. The terminal device of claim 2, wherein the information on the reception quality is acquired based on at least one of a signal to noise ratio (SNR), a volume of the received sound wave, a change rate of the volume of the received sound wave, sound pressure, and distance from a source of the sound wave.

6. The terminal device of claim 2, wherein the performance information is acquired based on at least one of a number of connected other terminal devices, a number of types of available communication networks, a connection method with a server, a power supply method, processing performance, memory performance, or a location movement status.

7. The terminal device of claim 2, wherein the processor is further configured to, based on a second score of the determined terminal device being less than a preset value, change a terminal device having a highest second score value, from among one or more other terminal devices which receive the sound wave, as the terminal device to acquire the sound wave for voice recognition.

8. The terminal device of claim 2, wherein at least one of a first score or a second score received from each of the one or more other terminal devices comprises information on at least one of the first score or the second score of a terminal device which is in communication with the one or more other terminal devices and which is not in communication with the terminal device.

9. The terminal device of claim 2, further comprising:
a microphone,
wherein the processor is further configured to:
based on the first score of the terminal device being less than the first score of the one or more other terminal devices, determine the one or more other terminal devices having a highest first score, from among the one or more other terminal devices, as an edge device,
based on the sound wave including the triggering word being received at the microphone, acquire information associated with reception quality based on at least a part of the sound wave, and
transmit the acquired information on the reception quality to the determined edge device.

10. The terminal device of claim 9, wherein the processor is further configured to, based on the second score of the terminal device being less than a preset value, not transmit the second score to the determined edge device.

11. The terminal device of claim 1, further comprising:
a memory including a voice recognition module,
wherein the processor is further configured to:
based on the sound wave being received from the determined terminal device, perform voice recognition on the sound wave using the voice recognition module, and
transmit the voice recognition result to an external server, and
wherein the external server is configured to:
determine a terminal device to perform an operation to correspond to the voice recognition result from among the terminal device and the one or more other terminal devices based on the voice recognition result, and
transmit an operation execution command corresponding to the voice recognition result to the terminal device to perform the operation.

12. A method of controlling a terminal device, the method comprising:
receiving information on performance information of one or more other terminal devices from each of the one or more other terminal devices;
identifying an edge device to determine a terminal device to perform voice recognition from among the terminal device and the one or more other terminal devices based on the performance information received from each of the one or more other terminal devices;
based on the terminal device being identified as the edge device, receiving information associated with reception quality from one or more other terminal devices which receive a sound wave including a triggering word from among the one or more other terminal devices which transmit the performance information;
determining a terminal device to acquire the sound wave for voice recognition from based on the received information associated with the reception quality, from among the one or more other terminal devices which receive the sound wave; and
transmitting, to the determined terminal device, a command to transmit the sound wave acquired for voice recognition to an external voice recognition device.

13. The method of claim 12,
wherein the performance information received from each of the one or more other terminals device comprises a first score that is acquired based on performance of the one or more other terminal devices, and
wherein the information associated with reception quality that is received from the one or more other terminal devices which receive the sound wave comprises a second score that represents reception quality associated with the sound wave received by the one or more other terminal devices.

14. The method of claim 13, wherein the determining comprises determining a terminal device having a highest second score value, from among the one or more other terminal devices which receive the sound wave, as a terminal device to acquire the sound wave for voice recognition.

15. The method of claim 13, wherein the determining comprises:
based on the sound wave including the triggering word being received at the terminal device, acquiring a second score of the terminal device based on at least a part of the sound wave,
determining a terminal device having a highest second score, from among the terminal device and the one or more other terminal devices which receive the sound wave, as a terminal device to acquire the sound wave for voice recognition,
based on the terminal device being determined as a terminal device to acquire the sound wave, acquiring a portion of the sound wave that is received after the triggering word, and
transmitting the acquired portion of the sound wave to an external voice recognition device.

16. The method of claim 13, wherein the information on the reception quality is acquired based on at least one of a signal to noise ratio (SNR), a volume of the received sound wave, a change rate of the volume of the received sound wave, sound pressure, and distance from a source of the sound wave.

17. The method of claim 13, wherein the performance information is acquired based on at least one of a number of connected other terminal devices, a number of types of available communication networks, a connection method with a server, a power supply method, processing performance, memory performance, or location movement status.

18. The method of claim 13, further comprising:
based on a second score of the determined terminal device being less than a preset value, changing a terminal device having a highest second score value, from among one or more other terminal devices which receive the voice, as a terminal device to acquire the sound wave for voice recognition.

19. The method of claim 13, wherein at least one of a first score or a second score received from each of the one or more other terminal devices comprises information on at least one of the first score or the second score of a terminal device which is in communication with the one or more other terminal devices and which is not in communication with the terminal device.

20. The method of claim 12, further comprising:
based on the sound wave being received from the determined terminal device, performing voice recognition on the sound wave using a voice recognition module stored in a memory; and
transmitting the voice recognition result to an external server,
wherein the external server determines a terminal device to perform an operation to correspond to the voice recognition result from among the terminal device and the one or more other terminal devices based on the voice recognition result, and transmits an operation execution command corresponding to the voice recognition result to the terminal device to perform the operation.

* * * * *